(12) United States Patent
Shiraishi

(10) Patent No.: US 10,652,540 B2
(45) Date of Patent: May 12, 2020

(54) IMAGE PROCESSING DEVICE, IMAGE PROCESSING METHOD, AND RECORDING MEDIUM STORING IMAGE PROCESSING PROGRAM

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 141 days.

(21) Appl. No.: 15/893,023

(22) Filed: Feb. 9, 2018

(65) Prior Publication Data

US 2018/0255300 A1 Sep. 6, 2018

(30) Foreign Application Priority Data

Mar. 3, 2017 (JP) ................................ 2017-041167

(51) Int. Cl.
| | |
|---|---|
| *H04N 19/124* | (2014.01) |
| *H04N 19/645* | (2014.01) |
| *H04N 19/176* | (2014.01) |
| *H04N 19/186* | (2014.01) |
| *H04N 19/63* | (2014.01) |
| *H04N 19/91* | (2014.01) |
| *H04N 19/94* | (2014.01) |
| *H04N 19/85* | (2014.01) |

(52) U.S. Cl.
CPC ......... *H04N 19/124* (2014.11); *H04N 19/176* (2014.11); *H04N 19/186* (2014.11); *H04N 19/63* (2014.11); *H04N 19/645* (2014.11); *H04N 19/85* (2014.11); *H04N 19/91* (2014.11); *H04N 19/94* (2014.11)

(58) Field of Classification Search
None
See application file for complete search history.

(56) References Cited

U.S. PATENT DOCUMENTS

| | | | | |
|---|---|---|---|---|
| 2002/0191855 | A1* | 12/2002 | Matsuura | ................ G06T 9/005 382/240 |
| 2004/0126020 | A1* | 7/2004 | Sakuyama | ............. H04N 19/13 382/232 |
| 2011/0228325 | A1 | 9/2011 | Shiraishi | |
| 2013/0094037 | A1 | 4/2013 | Shiraishi | |

FOREIGN PATENT DOCUMENTS

| | | |
|---|---|---|
| JP | 63-215281 | 9/1988 |
| JP | 7-288474 | 10/1995 |
| JP | 2001-204017 | 7/2001 |
| JP | 2001-218227 | 8/2001 |
| JP | 2002-199225 | 7/2002 |
| JP | 2004-032772 | 1/2004 |
| JP | 2016-053978 | 4/2016 |

* cited by examiner

*Primary Examiner* — Leon Viet Q Nguyen
(74) *Attorney, Agent, or Firm* — Oblon, McClelland, Maier & Neustadt, L.L.P.

(57) ABSTRACT

An image processing device includes circuitry. The circuitry reads YUV image data for each block of a predetermined size; performs discrete wavelet transform on a Y value of a pixel included in a block to obtain a first transformed Y value; multiplies the first transformed Y value by a coefficient used for inversely transforming the first transformed Y value, to calculate a second transformed Y value; and quantizes a U value and a V value included in the block and the second transformed Y value to generate fixed length encoded data.

9 Claims, 18 Drawing Sheets

FIG. 5A

$$Y_{LL} = \frac{(Y_a + Y_b + Y_c + Y_d)}{4}$$ : RANGE OF NUMERICAL VALUE IS 0 TO 255, EIGHT bits $$Y_{HL} = \frac{(Y_a + Y_b)}{2} - \frac{(Y_c + Y_d)}{2}$$ : RANGE OF NUMERICAL VALUE IS −255 TO 255, NINE bits $$Y_{LH} = \frac{(Y_a + Y_c)}{2} - \frac{(Y_b + Y_d)}{2}$$ : RANGE OF NUMERICAL VALUE IS −255 TO 255, NINE bits $$Y_{HH} = (Y_a - Y_b) - (Y_c - Y_d)$$ : RANGE OF NUMERICAL VALUE IS −511 TO 511, TEN bits

FIG. 5B

$$Y_a = Y_{LL} + \left\{ \frac{(Y_{HL} + Y_{LH})}{2} + \frac{Y_{HH}}{4} \right\}$$

$$Y_b = Y_{LL} + \left\{ \frac{(Y_{HL} - Y_{LH})}{2} - \frac{Y_{HH}}{4} \right\}$$

$$Y_c = Y_{LL} - \left\{ \frac{(Y_{HL} - Y_{LH})}{2} - \frac{Y_{HH}}{4} \right\}$$

$$Y_d = Y_{LL} - \left\{ \frac{(Y_{HL} + Y_{LH})}{2} + \frac{Y_{HH}}{4} \right\}$$

FIG. 5C

$$Y_{LL} = \frac{(Y_a + Y_b + Y_c + Y_d)}{4}$$ : RANGE OF NUMERICAL VALUE IS 0 TO 255, EIGHT bits $$Y_{HL} = \frac{\left\{ \frac{(Y_a + Y_b)}{2} - \frac{(Y_c + Y_d)}{2} \right\}}{2}$$ : RANGE OF NUMERICAL VALUE IS −127 TO 127, EIGHT bits $$Y_{LH} = \frac{\left\{ \frac{(Y_a + Y_c)}{2} - \frac{(Y_b + Y_d)}{2} \right\}}{2}$$ : RANGE OF NUMERICAL VALUE IS −127 TO 127, EIGHT bits $$Y_{HH} = \frac{(Y_a - Y_b) - (Y_c - Y_d)}{4}$$ : RANGE OF NUMERICAL VALUE IS −127 TO 127, EIGHT bits

FIG. 5D

VECTOR QUANTIZATION TABLE ($Y_{HH}$ VECTOR QUANTIZATION ADDRESS = 0)                1000

|  | $Y_{LH}$ VECTOR QUANTIZATION ADDRESS | | | | | | | | | | |
|---|---|---|---|---|---|---|---|---|---|---|---|
| | | 0 | 1 | 2 | 3 | ... | 12 | 13 | 14 | 15 |
| $Y_{HL}$ VECTOR QUANTIZATION ADDRESS | 0 | 0 | 16 | 31 | 45 | ... | | | | |
| | 1 | 1 | 17 | 32 | 46 | ... | 126 | 130 | 133 | 135 |
| | 2 | 2 | 18 | 33 | 47 | ... | 127 | 131 | 134 | |
| | 3 | 3 | 19 | 34 | 48 | ... | 128 | 132 | | |
| | 4 | 4 | 20 | 35 | 49 | ... | 129 | | | |
| | 5 | 5 | 21 | 36 | 50 | ... | | | | |
| | 6 | 6 | 22 | 37 | 51 | ... | | | | |
| | 7 | 7 | 23 | 38 | 52 | ... | | | | |
| | ... | ... | ... | ... | ... | | ... | ... | ... | ... |
| | 12 | 12 | 28 | 43 | 57 | | | | | |
| | 13 | 13 | 29 | 44 | | | | | | |
| | 14 | 14 | 30 | | | | | | | |
| | 15 | 15 | | | | | | | | |

FIG. 10B

Vector Quantization Table ($Y_{HH}$ Vector Quantization Address = 1) — 1001

| $Y_{HL}$ Vector Quantization Address \ $Y_{LH}$ Vector Quantization Address | 0 | 1 | 2 | 3 | ... | 12 | 13 | 14 | 15 |
|---|---|---|---|---|---|---|---|---|---|
| 0 | 136 | 151 | 166 | 180 | ... | 261 | 265 | 268 | |
| 1 | 137 | 152 | 167 | 181 | ... | 262 | 266 | 269 | |
| 2 | 138 | 153 | 168 | 182 | ... | 263 | 267 | | |
| 3 | 139 | 154 | 169 | 183 | ... | 264 | | | |
| 4 | 140 | 155 | 170 | 184 | ... | | | | |
| 5 | 141 | 156 | 171 | 185 | ... | | | | |
| 6 | 142 | 157 | 172 | 186 | ... | | | | |
| 7 | 143 | 158 | 173 | 187 | ... | | | | |
| ... | ... | ... | ... | ... | | | | | |
| 12 | 148 | 163 | 178 | 192 | | | | | |
| 13 | 149 | 164 | 179 | | | | | | |
| 14 | 150 | 165 | | | | | | | |
| 15 | | | | | | | | | |

| INVERSE VECTOR QUANTIZATION TABLE | | | |
|---|---|---|---|
| VECTOR NUMBER | $Y_{HL}$ | $Y_{LH}$ | $Y_{HH}$ |
| 0 | 0 | 0 | 0 |
| 1 | 1 | 0 | 0 |
| 2 | 2 | 0 | 0 |
| 3 | 3 | 0 | 0 |
| 4 | 4 | 0 | 0 |
| 5 | 5 | 0 | 0 |
| ... | ... | ... | ... |
| 132 | 2 | 13 | 0 |
| 133 | 0 | 14 | 0 |
| 134 | 1 | 14 | 0 |
| 135 | 0 | 15 | 0 |

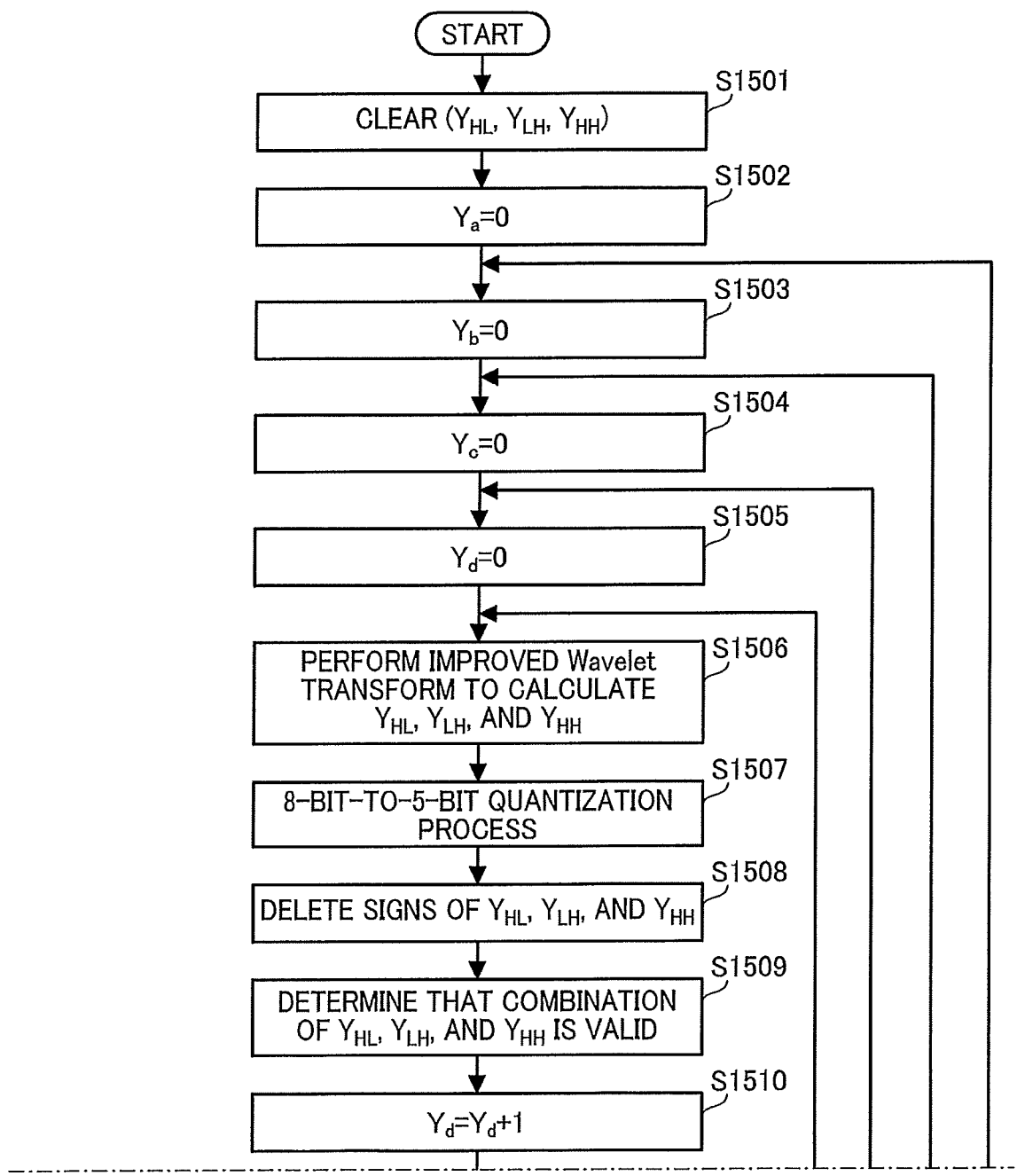

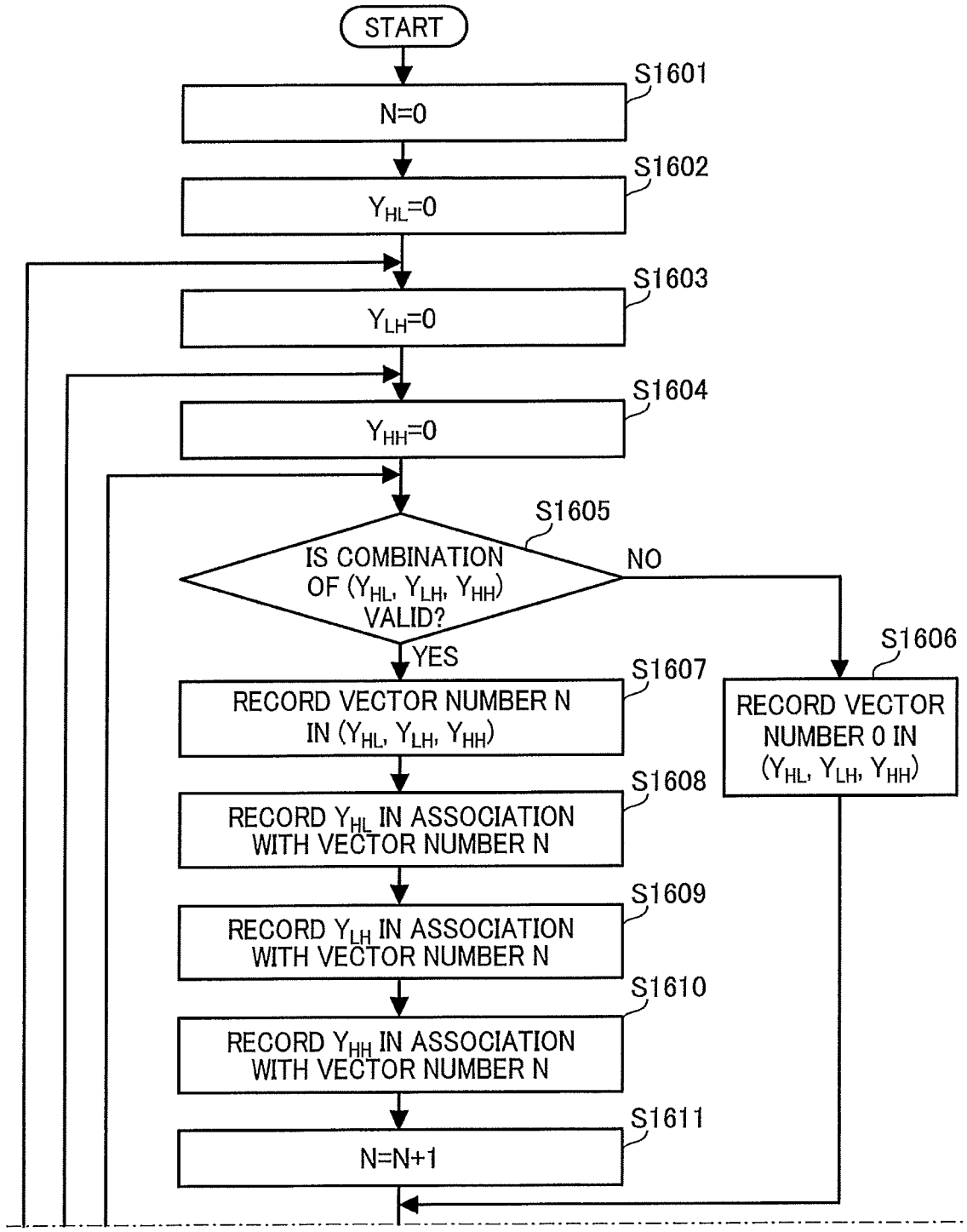

IMAGE PROCESSING DEVICE, IMAGE PROCESSING METHOD, AND RECORDING MEDIUM STORING IMAGE PROCESSING PROGRAM

CROSS-REFERENCE TO RELATED APPLICATIONS

This patent application is based on and claims priority pursuant to 35 U.S.C. § 119(a) to Japanese Patent Application No. 2017-041167, filed on Mar. 3, 2017, in the Japan Patent Office, the entire disclosure of which is hereby incorporated by reference herein.

BACKGROUND

Technical Field

Aspects of the present disclosure relate to an image processing device, an image processing method, and a recording medium storing an image processing program.

Related Art

In an image processing device that processes image data captured by an imaging device or the like, in order to achieve, for example, speeding up of memory access and reduction of power consumption, conventionally, image data is quantized and encoded data of a fixed length is generated before data is written to a memory.

As a method for generating encoded data of a fixed length, for example, a method of dividing YUV image data into a low frequency component and a high frequency component by discrete wavelet transform and quantizing the high frequency component is disclosed.

SUMMARY

In an aspect of the present disclosure, there is provided an image processing device including circuitry. The circuitry reads YUV image data for each block of a predetermined size; performs discrete wavelet transform on a Y value of a pixel included in a block to obtain a first transformed Y value; multiplies the first transformed Y value by a coefficient used for inversely transforming the first transformed Y value, to calculate a second transformed Y value; and quantizes a U value and a V value included in the block and the second transformed Y value to generate fixed length encoded data.

In another aspect of the present disclosure, there is provided an image processing method that includes reading YUV image data for each block of a predetermined size; performing discrete wavelet transform on a Y value of a pixel included in a block to obtain a first transformed Y value; multiplying the first transformed Y value by a coefficient used for inversely transforming the first transformed Y value, to calculate a second transformed Y value; and quantizing a U value and a V value included in the block and the second transformed Y value to generate fixed length encoded data.

In still another aspect of the present disclosure, there is provided a non-transitory recording medium storing an image processing program to cause a computer to execute reading YUV image data for each block of a predetermined size; performing discrete wavelet transform on a Y value of a pixel included in a block to obtain a first transformed Y value; multiplying the first transformed Y value by a coefficient used for inversely transforming the first transformed Y value, to calculate a second transformed Y value; and quantizing a U value and a V value included in the block and the second transformed Y value to generate fixed length encoded data.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A to 5D are diagrams for explaining processes in an improved wavelet transformer and an improved inverse transformer;

FIGS. 10A and 10B are diagrams illustrating specific examples of a vector quantization table stored in the vector memory;

Figure 1:
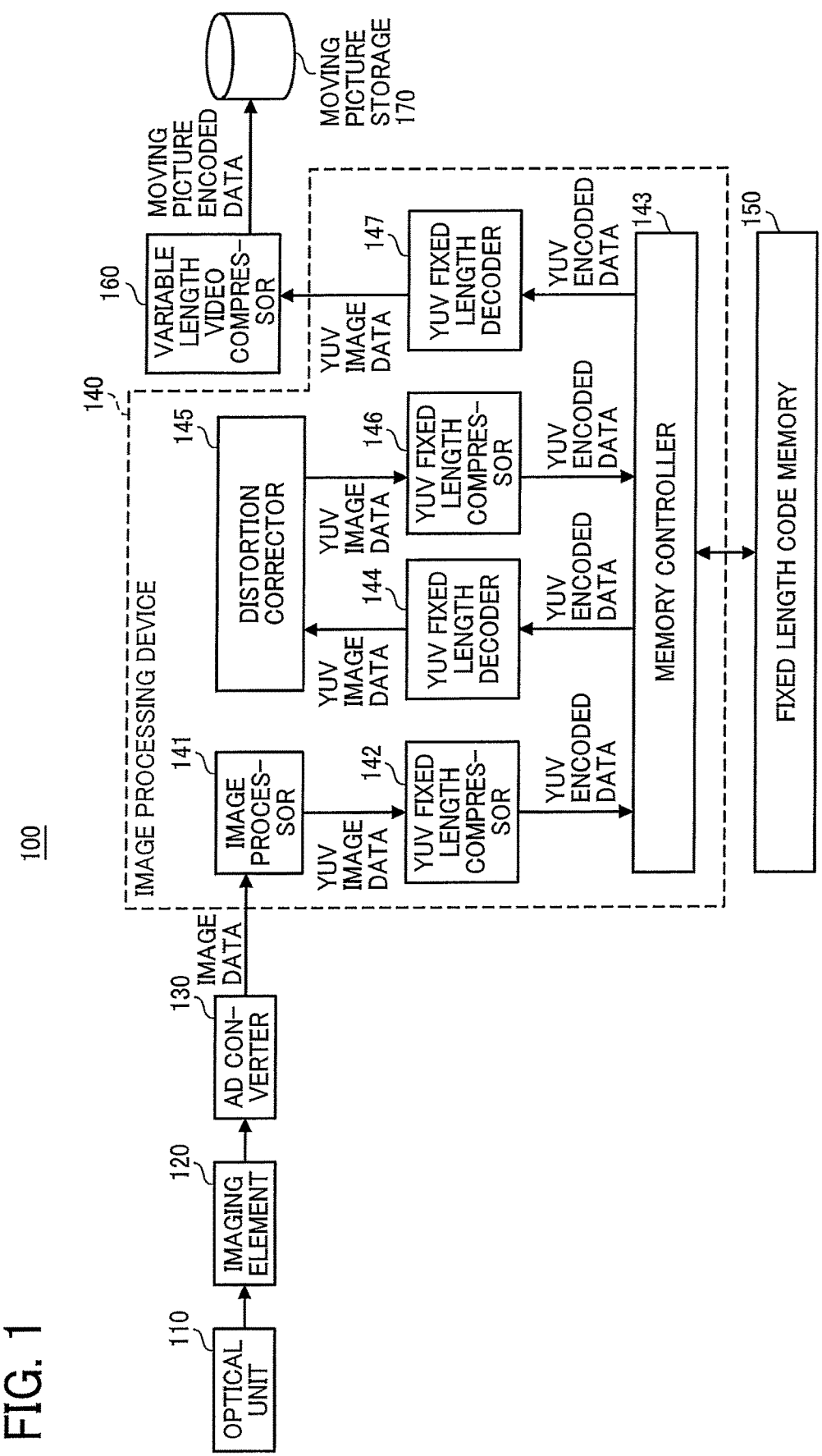
FIG. 1 is a diagram illustrating an arrangement example of an imaging system.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, the details of each embodiment will be described with reference to the attached drawings. In describing the specification and the drawings according to the respective embodiments, the same reference numerals will be given to the constituent elements having substantially the same functional arrangement to omit redundant explanation.

First Embodiment

<1. Arrangement of Imaging System>

First, the arrangement of an imaging system having an image processing device according to a first embodiment will be described. FIG. 1 is a diagram illustrating an arrangement example of the imaging system.

As illustrated in FIG. 1, the imaging system 100 includes an optical unit 110, an imaging element 120, an AD converter 130, an image processing device 140, a fixed length code memory 150, a variable length video compressor 160, and a moving picture storage 170.

The optical unit 110 has a wide-angle lens and focuses light reflected from a subject included, for example, in a field angle of 180 degrees to the imaging element 120. The imaging element 120 is a charge coupled device (CCD) sensor or a complementary metal oxide semiconductor (CMOS) sensor and converts the reflected light focused by the optical unit 110 into an electrical signal to output.

The AD converter 130 converts the electrical signal output from the imaging element 120 into a digital signal and outputs image data.

The image processing device 140 converts the image data into YUV image data and performs a distortion correction process on the YUV image data to sequentially output to the variable length video compressor 160. The image processing device 140 includes an image processor 141, YUV fixed length compressors 142 and 146, YUV fixed length decoders 144 and 147, a memory controller 143, and a distortion corrector 145.

In the present embodiment, each member of the image processing device 140 is implemented, for example, by a dedicated integrated circuit. However, the method for implementing each member of the image processing device 140 is not limited to this example. For example, each member may be implemented by a programmable logic device such as a field programmable gate array (FPGA). Alternatively, each member may be implemented by a computer having a central processing unit (CPU), a read only memory (ROM), and a random access memory (RAM) by executing an image processing program.

The image processor 141 converts the image data output from the AD converter 130 into the YUV image data.

The YUV fixed length compressors 142 and 146 quantize the YUV image data to generate YUV encoded data of a fixed length (fixed length encoded data). The YUV fixed length compressors 142 and 146 also store the generated YUV encoded data to the fixed length code memory 150 via the memory controller 143.

The YUV fixed length decoders 144 and 147 read the YUV encoded data from the fixed length code memory 150 via the memory controller 143 and generate YUV image data by decoding the YUV encoded data. The memory controller 143 controls writing of the YUV encoded data into the fixed length code memory 150 and reading of the YUV encoded data from the fixed length code memory 150.

The distortion corrector 145 performs the distortion correction process on the YUV image data. In general, an image captured via a wide-angle lens is distorted and the distortion corrector 145 performs the distortion correction process to perform geometric transformation.

The fixed length code memory 150 is a double data rate (DDR) memory and stores the YUV encoded data.

The variable length video compressor 160 performs a moving picture compression process of converting the YUV image data sequentially output from the image processing device 140 into a format such as moving picture experts group (MPEG) and generates moving picture encoded data. The variable length video compressor 160 stores the generated moving picture encoded data to the moving picture storage 170.

<2. Details of Each Member of Image Processing Device>

Next, details of components of the image processing device 140 (here, the image processor 141, the YUV fixed length compressors 142 and 146, and the YUV fixed length decoders 144 and 147) will be described.

<2.1 Details of Image Processor>

Figure 2:
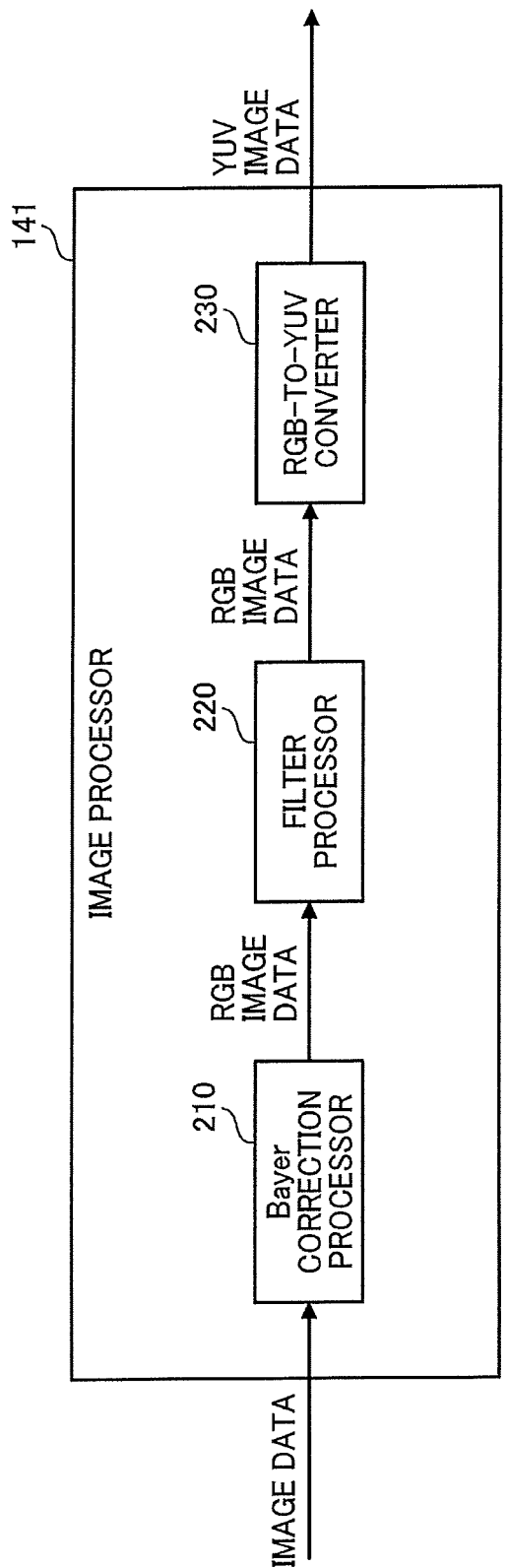
FIG. 2 is a diagram illustrating an arrangement example of an image processor of an image processing device according to a first embodiment.

FIG. 2 is a diagram illustrating an arrangement example of the image processor of the image processing device according to the first embodiment. As illustrated in FIG. 2, the image processor 141 includes a Bayer correction processor 210, a filter processor 220, and an RGB-to-YUV converter 230.

The Bayer correction processor 210 reads Bayer type image data and performs a correction process on the Bayer type image data to generate RGB image data. The filter processor 220 performs a filter process on the RGB image data.

The RGB-to-YUV converter 230 performs color conversion from RGB values of each pixel of the RGB image data on which the filter process has been performed into YUV values made up of a luminance and a color difference and outputs the YUV image data.

<2.2 Details of YUV Fixed Length Compressor>

Figure 3:
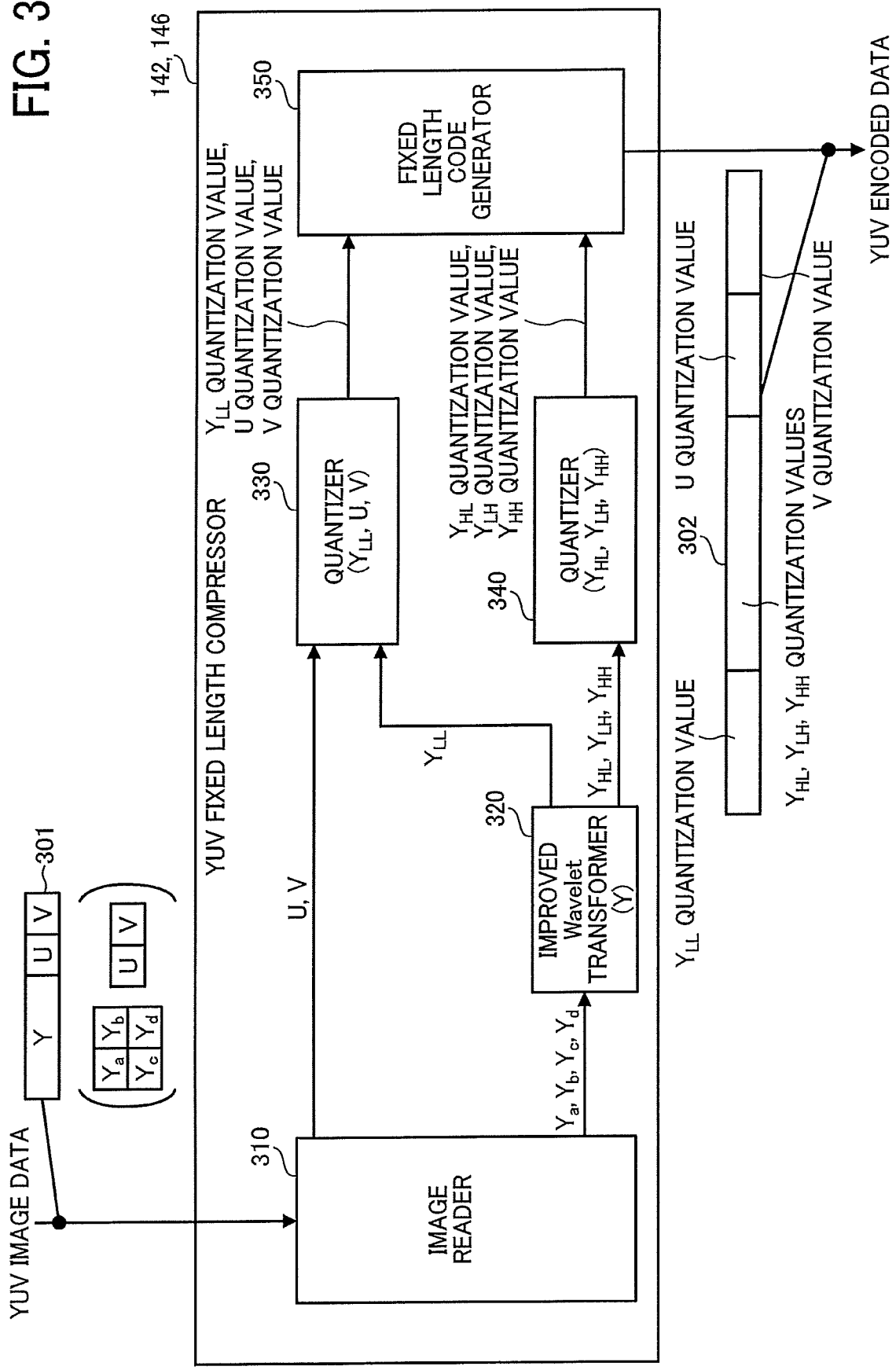
FIG. 3 is a diagram illustrating an arrangement example of a YUV fixed length compressor of the image processing device according to the first embodiment.

FIG. 3 is a diagram illustrating an arrangement example of the YUV fixed length compressor of the image processing device according to the first embodiment. As described above, the YUV fixed length compressors 142 and 146 quantize the YUV image data to generate the YUV encoded data of a fixed length.

As illustrated in FIG. 3, each of the YUV fixed length compressors 142 and 146 includes an image reader 310, an improved Wavelet transformer (Y) 320, a quantizer ($Y_{LL}$, U, V) 330, a quantizer ($Y_{HL}$, $Y_{LH}$, $Y_{HH}$) 340, and a fixed length code generator 350.

The image reader 310 is an example of a reader and reads the YUV image data. As illustrated in FIG. 3, the image reader 310 sequentially reads a block 301 of a predetermined size (in this example, 2×2 pixels). The block 301 includes luminance values for four pixels (Y values; hereinafter expressed as $Y_a$, $Y_b$, $Y_c$, and $Y_d$), a U value for one pixel, and a V value for one pixel.

The image reader 310 transfers the U value and the V value included in the block 301 to the quantizer ($Y_{LL}$, U, V) 330. The image reader 310 also transfers the luminance values ($Y_a$, $Y_b$, $Y_c$, and $Y_d$) included in the block 301 to the improved Wavelet transformer (Y) 320.

The improved Wavelet transformer (Y) 320 is an example of a transformer and performs an improved type discrete wavelet transform process on the luminance values ($Y_a$, $Y_b$, $Y_c$, and $Y_d$) to calculate $Y_{LL}$, $Y_{HL}$, $Y_{LH}$, and $Y_{HH}$. The details of the improved type discrete wavelet transform process will be described later.

The improved Wavelet transformer (Y) 320 transfers calculated $Y_{LL}$ (low frequency component) to the quantizer ($Y_{LL}$, U, V) 330 and transfers $Y_{HL}$, $Y_{LH}$, and $Y_{HH}$ (components except the low frequency component) to the quantizer ($Y_{HL}$, $Y_{LH}$, $Y_{HH}$) 340.

The quantizer ($Y_{LL}$, U, V) 330 quantizes the U value and the V value transferred from the image reader 310 and transfers a U quantization value and a V quantization value to the fixed length code generator 350. The quantizer ($Y_{LL}$, U, V) 330 also quantizes $Y_{LL}$ transferred from the improved Wavelet transformer (Y) 320 and transfers a $Y_{LL}$, quantization value to the fixed length code generator 350.

The quantizer ($Y_{HL}$, $Y_{LH}$, $Y_{HH}$) 340 quantizes $Y_{HL}$, $Y_{LH}$, and $Y_{HH}$ transferred from the improved Wavelet transformer (Y) 320 and transfers a $Y_{HL}$ quantization value, a $Y_{LH}$ quantization value, and a $Y_{HH}$ quantization value to the fixed length code generator 350.

The fixed length code generator 350 is an example of a generator and acquires the $Y_{LL}$ quantization value, the U quantization value, and the V quantization value transferred from the quantizer ($Y_{LL}$, U, V) 330. The fixed length code generator 350 also acquires the $Y_{HL}$ quantization value, the $Y_{LH}$ quantization value, and the $Y_{HH}$ quantization value transferred from the quantizer ($Y_{HL}$, $Y_{LH}$, $Y_{HH}$) 340. Furthermore, the fixed length code generator 350 generates the YUV encoded data of a fixed length illustrated in a code format 302 based on each acquired quantization value to output.

<2.3 Details of YUV Fixed Length Decoder>

Figure 4:
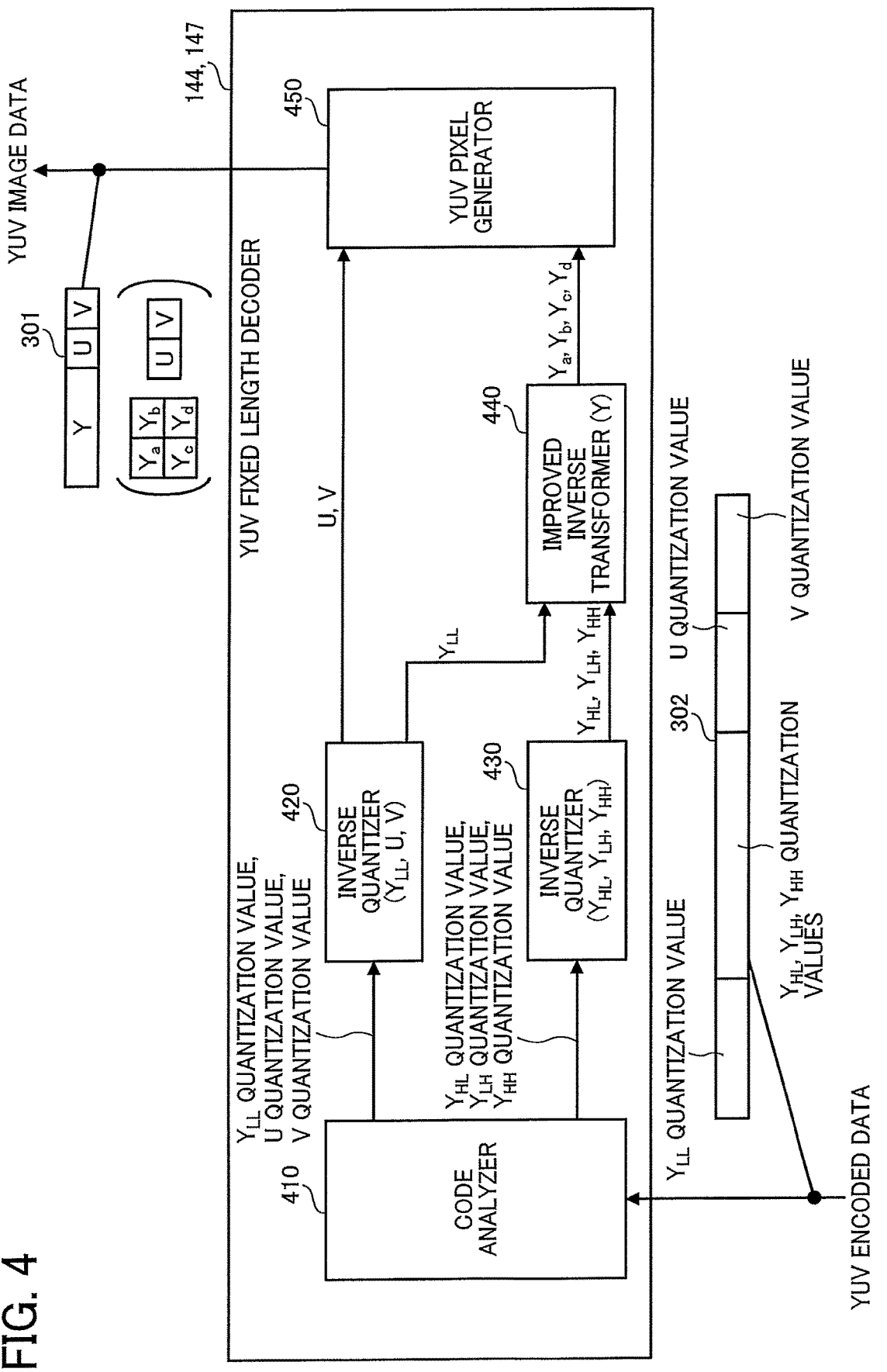
FIG. 4 is a diagram illustrating an arrangement example of a YUV fixed length decoder of the image processing device according to the first embodiment.

FIG. 4 is a diagram illustrating an arrangement example of the YUV fixed length decoder of the image processing device according to the first embodiment. As described above, the YUV fixed length decoders 144 and 147 read the YUV encoded data from the fixed length code memory 150 and generate the YUV image data by decoding the YUV encoded data.

As illustrated in FIG. 4, each of the YUV fixed length decoders 144 and 147 includes a code analyzer 410, an inverse quantizer ($Y_{LL}$, U, V) 420, an inverse quantizer ($Y_{HL}$, $Y_{LH}$, $Y_{HH}$) 430, an improved inverse transformer (Y) 440, and a YUV pixel generator 450.

The code analyzer 410 sequentially analyzes the YUV encoded data illustrated in the code format 302 and transfers the $Y_{LL}$ quantization value, the U quantization value, and the V quantization value to the inverse quantizer ($Y_{LL}$, U, V) 420. The code analyzer 410 also transfers the $Y_{HL}$ quantization value, the $Y_{LH}$ quantization value, and the $Y_{HH}$ quantization value to the inverse quantizer ($Y_{HL}$, $Y_{LH}$, $Y_{HH}$) 430.

The inverse quantizer ($Y_{LL}$, U, V) 420 inversely quantizes the $Y_{LL}$ quantization value transferred from the code analyzer 410 to calculate $Y_{LL}$ and transfers calculated $Y_{LL}$ to the improved inverse transformer (Y) 440. The inverse quantizer ($Y_{LL}$, U, V) 420 also inversely quantizes the U quantization value and the V quantization value transferred from the code analyzer 410 to calculate the U value and the V value and transfers the calculated U value and V value to the YUV pixel generator 450.

The inverse quantizer ($Y_{HL}$, $Y_{LH}$, $Y_{HH}$) 430 inversely quantizes the $Y_{HL}$ quantization value, the $Y_{LH}$ quantization value, and the $Y_{HH}$ quantization value transferred from the code analyzer 410 to calculate $Y_{HL}$, $Y_{LH}$, and $Y_{HH}$. In addition, the inverse quantizer ($Y_{HL}$, $Y_{LH}$, $Y_{HH}$) 430 transfers calculated $Y_{HL}$, $Y_{LH}$, and $Y_{HH}$ to the improved inverse transformer (Y) 440.

The improved inverse transformer (Y) 440 is an example of an inverse transformer. The improved inverse transformer (Y) 440 performs an improved type inverse transform process on $Y_{LL}$ transferred from the inverse quantizer ($Y_{LL}$, U, V) 420 and $Y_{HL}$, $Y_{LH}$, and $Y_{HH}$ transferred from the inverse quantizer ($Y_{HL}$, $Y_{LH}$, $Y_{HH}$) 430. As a consequence, the improved inverse transformer (Y) 440 calculates the luminance values ($Y_a$, $Y_b$, $Y_c$, and $Y_d$). The details of the improved type inverse transform process will be described later.

The improved inverse transformer (Y) 440 transfers the calculated luminance values ($Y_a$, $Y_b$, $Y_c$, and $Y_d$) to the YUV pixel generator 450.

The YUV pixel generator 450 acquires the luminance values ($Y_a$, $Y_b$, $Y_c$, and $Y_d$) transferred from the improved inverse transformer (Y) 440. The YUV pixel generator 450 also acquires the U value and the V value transferred from the inverse quantizer ($Y_{LL}$, U, V) 420. Furthermore, the YUV pixel generator 450 generates the block 301 of 2×2 pixels based on the acquired values to output as the YUV image data.

<2.4 Details of Processes of Improved Wavelet Transformer and Improved Inverse Transformer>

Next, the details of the improved type discrete wavelet transform process by the improved Wavelet transformer (Y) 320 and the improved type inverse transform process by the improved inverse transformer (Y) 440 will be described. FIGS. 5A to 5D are diagrams for explaining processes in the improved wavelet transformer and the improved inverse transformer.

Among these diagrams, FIG. 5A illustrates the details of a discrete wavelet transform process (Haar Wavelet transform process) of a general Wavelet transformer as a comparative example. Similarly, FIG. 5B illustrates the details of an inverse transform process (an inverse transform process of the Haar Wavelet transform) of a general inverse transformer as a comparative example.

As illustrated in FIG. 5A, in the general discrete wavelet transform process, the luminance values ($Y_a$, $Y_b$, $Y_c$, and $Y_d$) are transformed based on the following expressions and $Y_{LL}$, $Y_{HL}$, $Y_{LH}$, and $Y_{HH}$ are calculated.

[Mathematical Expression 1]

The range of the numerical value is 0 to 255, eight bits
The range of the numerical value is −255 to 255, nine bits
The range of the numerical value is −255 to 255, nine bits
The range of the numerical value is −511 to 511, ten bits Meanwhile, as illustrated in FIG. 5B, in the general inverse transform process, $Y_{LL}$, $Y_{HL}$, $Y_{LH}$, and $Y_{HH}$ are inversely transformed based on the following expressions and the luminance values ($Y_a$, $Y_b$, $Y_e$, and $Y_d$) are calculated.

$$Y_a = Y_{LL} + \left\{\frac{(Y_{HL} + Y_{LH})}{2} + \frac{Y_{HH}}{4}\right\}$$

$$Y_b = Y_{LL} + \left\{\frac{(Y_{HL} - Y_{LH})}{2} - \frac{Y_{HH}}{4}\right\}$$

[Mathematical Expression 2]

-continued $$Y_c = Y_{LL} - \left\{ \frac{(Y_{HL} - Y_{LH})}{2} - \frac{Y_{HH}}{4} \right\}$$

$$Y_d = Y_{LL} - \left\{ \frac{(Y_{HL} + Y_{LH})}{2} + \frac{Y_{HH}}{4} \right\}$$

Here, the range of the numerical value of $Y_{LL}$ calculated by the general discrete wavelet transform process is 0 to 255 and the number of bits is eight bits. In addition, the range of the numerical value of $Y_{HL}$ and $Y_{LH}$ is −255 to 255 and the number of bits is nine bits. Furthermore, the range of the numerical value of $Y_{HH}$ is −511 to 511 and the number of bits is ten bits.

That is, the total number of bits of $Y_{HL}$, $Y_{LH}$, and $Y_{HH}$ among $Y_{LL}$, $Y_{HL}$, $Y_{LH}$, and $Y_{HH}$ calculated by the general discrete wavelet transform process is 28 bits. As described above, the fixed length code generator 350 generates the YUV encoded data of a fixed length illustrated in the code format 302. Therefore, when $Y_{HL}$, $Y_{LH}$, and $Y_{HH}$ are calculated by the general discrete wavelet transform process, it is necessary for the quantizer ($Y_{HL}$, $Y_{LH}$, $Y_{HH}$) 340 to reduce the number of bits by an amount equivalent to at least (28-X) bits through the lossy compression or the lossless compression. Note that X represents the number of bits allocated to the $Y_{HL}$, $Y_{LH}$, and $Y_{HH}$ quantization values in the code format 302.

Here, as illustrated in FIG. 5B, in the general inverse transform process, when the luminance values ($Y_a$, $Y_b$, $Y_c$, and $Y_d$) are calculated, each of $Y_{HL}$, $Y_{LH}$, and $Y_{HH}$ is multiplied by ½ or ¼ (refer to the above expressions). However, in a case where these values are to be multiplied by ½ or ¼ during the inverse transform process, if the values are multiplied by ½ or ¼ in advance during the discrete wavelet transform process, it becomes unnecessary to multiply the values by ½ or ¼ during the inverse transform process. Furthermore, the number of bits after the discrete wavelet transform process can be decreased.

The improved Wavelet transformer (Y) 320 and the improved inverse transformer (Y) 440 of the present embodiment use a transform technique and an inverse transform technique focusing on this point.

Specifically, the improved Wavelet transformer (Y) 320 multiplies $Y_{HL}$ obtained by the general discrete wavelet transform process ($Y_{HL}$ after a first transform) by a coefficient of $Y_{HL}$ used in the general inverse transform process (=½) in advance. In the present embodiment, this process is referred to as improved type discrete wavelet transform process. That is, the improved Wavelet transformer (Y) 320 calculates $Y_{HL}$ by the improved type discrete wavelet transform process ($Y_{HL}$ after a second transform).

Similarly, the improved Wavelet transformer (Y) 320 multiplies $Y_{LH}$ obtained by the general discrete wavelet transform process ($Y_{LH}$ after the first transform) by a coefficient of $Y_{LH}$ used in the general inverse transform process (=½) in advance. That is, the improved Wavelet transformer (Y) 320 calculates $Y_{LH}$ by the improved type discrete wavelet transform process ($Y_{LH}$ after the second transform).

Similarly, the improved Wavelet transformer (Y) 320 multiplies $Y_{HH}$ obtained by the general discrete wavelet transform process ($Y_{HH}$ after the first transform) by a coefficient of $Y_{HH}$ used in the general inverse transform process (=¼) in advance. That is, the improved Wavelet transformer (Y) 320 calculates $Y_{HH}$ by the improved type discrete wavelet transform process ($Y_{HH}$ after the second transform).

On the other hand, the improved inverse transformer (Y) 440 performs the inverse transform process excluding the coefficients of $Y_{HL}$, $Y_{LH}$, and $Y_{HH}$ used in the general inverse transform process to calculate the luminance values $Y_a$, $Y_b$, $Y_c$, and $Y_d$). In the present embodiment, this process is referred to as improved type inverse transform process. That is, the improved inverse transformer (Y) 440 calculates the luminance values ($Y_a$, $Y_b$, $Y_c$, and $Y_d$) by the improved type inverse transform process.

More specific description will be made with reference to FIGS. 5C and 5D. FIG. 5C illustrates the details of the improved type discrete wavelet transform process by the improved Wavelet transformer (Y) 320. FIG. 5D illustrates the details of the improved type inverse transform process by the improved inverse transformer (Y) 440.

As illustrated in FIG. 5C, in the improved type discrete wavelet transform process, the luminance values ($Y_a$, $Y_b$, $Y_c$, and $Y_d$) are transformed based on the following expressions and $Y_{LL}$, $Y_{HL}$, $Y_{LH}$, and $Y_{HH}$ are calculated.

[Mathematical Expression 3]

The range of the numerical value is 0 to 255, eight bits
The range of the numerical value is −127 to 127, eight bits
The range of the numerical value is −127 to 127, eight bits
The range of the numerical value is −127 to 127, eight bits Meanwhile, as illustrated in FIG. 5D, in the improved type inverse transform process, $Y_{LL}$, $Y_{HL}$, $Y_{LH}$, and $Y_{HH}$ are inversely transformed based on the following expressions and the luminance values ($Y_a$, $Y_b$, $Y_c$, and $Y_d$) are calculated.

[Mathematical Expression 4]

$$Y_a = Y_{LL} + Y_{HL} + Y_{LH} + Y_{HH}$$

$$Y_b = Y_{LL} + (Y_{HL} - Y_{LH}) - Y_{HH}$$

$$Y_c = Y_{LL} - (Y_{HL} - Y_{LH}) - Y_{HH}$$

$$Y_d = Y_{LL} - (Y_{HL} + Y_{LH}) + Y_{HH}$$

Here, the range of the numerical value of $Y_{LL}$ calculated by the improved type discrete wavelet transform process is 0 to 255 and the number of bits is eight bits. In addition, the range of the numerical value of $Y_{HL}$ and $Y_{LH}$ is −127 to 127 and the number of bits is eight bits. Furthermore, the range of the numerical value of $Y_{HH}$ is −127 to 127 and the number of bits is eight bits.

That is, the total number of bits of $Y_{HL}$, $Y_{LH}$, and $Y_{HH}$ among $Y_{LL}$, $Y_{HL}$, $Y_{LH}$, and $Y_{HH}$ calculated by the improved type discrete wavelet transform process is 24 bits. As described above, the fixed length code generator 350 generates the YUV encoded data of a fixed length illustrated in the code format 302. Therefore, when $Y_{HL}$, $Y_{LH}$, and $Y_{HH}$ are calculated by the improved type discrete wavelet transform process, it is only required for the quantizer ($Y_{HL}$, $Y_{LH}$, $Y_{HH}$) 340 to reduce the number of bits by an amount equivalent to (24-X) bits during quantization. That is, in generating the YUV encoded data of a fixed length, the number of bits to be reduced by the lossy compression can be decreased by four bits.

As a result, when the YUV encoded data is generated using the improved type discrete wavelet transform process, it is possible to suppress degradation of the image quality that occurs at the time of decoding the YUV image data, as compared with the case of generating the YUV encoded data using the general discrete wavelet transform process.

In addition, in the case of the improved type inverse transform process, calculation of multiplying each of $Y_{LL}$, $Y_{HL}$, $Y_{LH}$, and $Y_{HH}$ by ½ or ¼ as in the general inverse transform process becomes unnecessary. That is, in the case of the improved type inverse transform process, the process at the time of decoding the YUV image data can be simplified as compared with the case of the general inverse transform process.

<3. Details of Variable Length Video Compressor>

Figure 6:
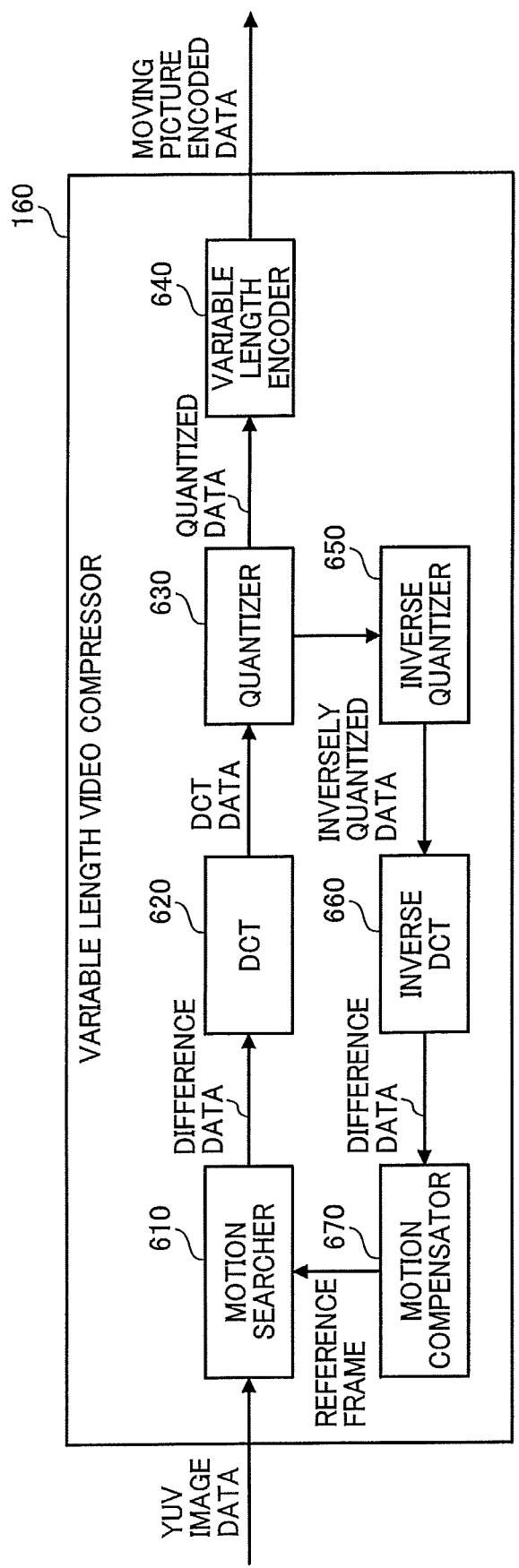
FIG. 6 is a diagram illustrating an arrangement example of a variable length video compressor.

Next, the details of the variable length video compressor 160 will be described. FIG. 6 is a diagram illustrating an arrangement example of the variable length video compressor.

As illustrated in FIG. 6, the variable length video compressor 160 includes a motion searcher 610, a discrete cosine transformer (DCT) 620, a quantizer 630, a variable length encoder 640, an inverse quantizer 650, an inverse DCT 660, and a motion compensator 670.

The motion searcher 610 calculates difference data with respect to a block having the highest correlation with a reference frame of the YUV image data output from the motion compensator 670 among blocks included in a frame of the YUV image data output from the image processing device 140.

The DCT 620 transforms the difference data calculated by the motion searcher 610 into a spatial frequency to transfer to the quantizer 630 as discrete cosine transform (DCT) data.

The quantizer 630 quantizes the DCT data transferred from the DCT 620 to transfer to the variable length encoder 640 and the inverse quantizer 650 as quantized data.

The variable length encoder 640 performs variable length encoding on the quantized data transferred from the quantizer 630 to output as moving picture encoded data.

The inverse quantizer 650 inversely quantizes each block of the quantized data transferred from the quantizer 630 to transfer to the inverse DCT 660 as inversely quantized data.

The inverse DCT 660 performs inverse frequency transform on the inversely quantized data transferred from the inverse quantizer 650 to transfer to the motion compensator 670 as difference data.

The motion compensator 670 adds the difference data output from the inverse DCT 660 to a macroblock of the YUV image data in a previous frame on which motion compensation has been performed to generate the YUV image data of the reference frame and transfers the YUV image data of the reference frame to the motion searcher 610.

<4. Summary>

As is apparent from the above description, the image processing device 140 according to the present embodiment:

performs the general discrete wavelet transform process on the luminance values ($Y_a$, $Y_b$, $Y_c$, and $Y_d$) of the YUV image data to calculate $Y_HL$, $Y_{LH}$, and $Y_{HH}$ after the first transform; furthermore, multiplies $Y_{HL}$, $Y_{LH}$, and $Y_{HH}$ after the first transform by the coefficient used in the general inverse transform process (½ or ¼) to calculate $Y_{HL}$, $Y_{LH}$, and $Y_{HH}$ after the second transform;—quantizes $Y_{HL}$, $Y_{LH}$, and $Y_{HH}$ after the second transform to calculate the $Y_{HL}$ quantization value, the $Y_{LH}$ quantization value, and the $Y_{HH}$ quantization value and generates the fixed length encoded data; and —performs the inverse transform process on $Y_{HL}$, $Y_{LH}$, and $Y_{HH}$ calculated by inversely quantizing the $Y_{HL}$ quantization value, the $Y_{LH}$ quantization value, and the $Y_{HH}$ quantization value included in the fixed length encoded data and calculates the luminance values ($Y_a$, $Y_b$, $Y_c$, and $Y_d$); at this time, performs the inverse transform process excluding the coefficient of $Y_{HL}$, $Y_{LH}$, and $Y_{HH}$ used in the general inverse transform process (½ or ¼) to calculate the luminance values ($Y_a$, $Y_b$, $Y_c$, and $Y_d$).

As a consequence, the image processing device 140 according to the present embodiment can decrease the number of bits of $Y_{HL}$, $Y_{LH}$, and $Y_{HH}$ after the transform process, as compared with the case of using the general discrete wavelet transform process. That is, when the YUV encoded data of a fixed length is generated, the number of bits to be reduced by the lossy compression can be decreased. Additionally, in the image processing device 140 according to the present embodiment, it becomes unnecessary to calculate the multiplication by the coefficient (½ or ¼) during the inverse transform process, as compared with the case of using the general inverse transform process.

As a result, the image processing device 140 according to the present embodiment can suppress degradation of the image quality that occurs at the time of decoding the YUV image data. Additionally, the image processing device 140 according to the present embodiment can simplify the process at the time of decoding the YUV image data.

Second Embodiment

In the arrangement of the first embodiment described above, the improved Wavelet transformer is provided in the YUV fixed length compressor and the improved inverse transformer is provided in the YUV fixed length decoder, whereby degradation of the image quality that occurs at the time of decoding the YUV image data is suppressed.

In contrast to this arrangement, in a second embodiment, an improved quantizer is further provided in the YUV fixed length compressor and an improved inverse quantizer is further provided in the YUV fixed length decoder, whereby the number of bits to be reduced by the lossy compression is decreased when the YUV encoded data of a fixed length is generated. Hereinafter, the second embodiment will be described focusing on differences from the first embodiment described above.

<1. Details of YUV Fixed Length Compressor>

(1) Functional Arrangement of YUV Fixed Length Compressor

Figure 7:
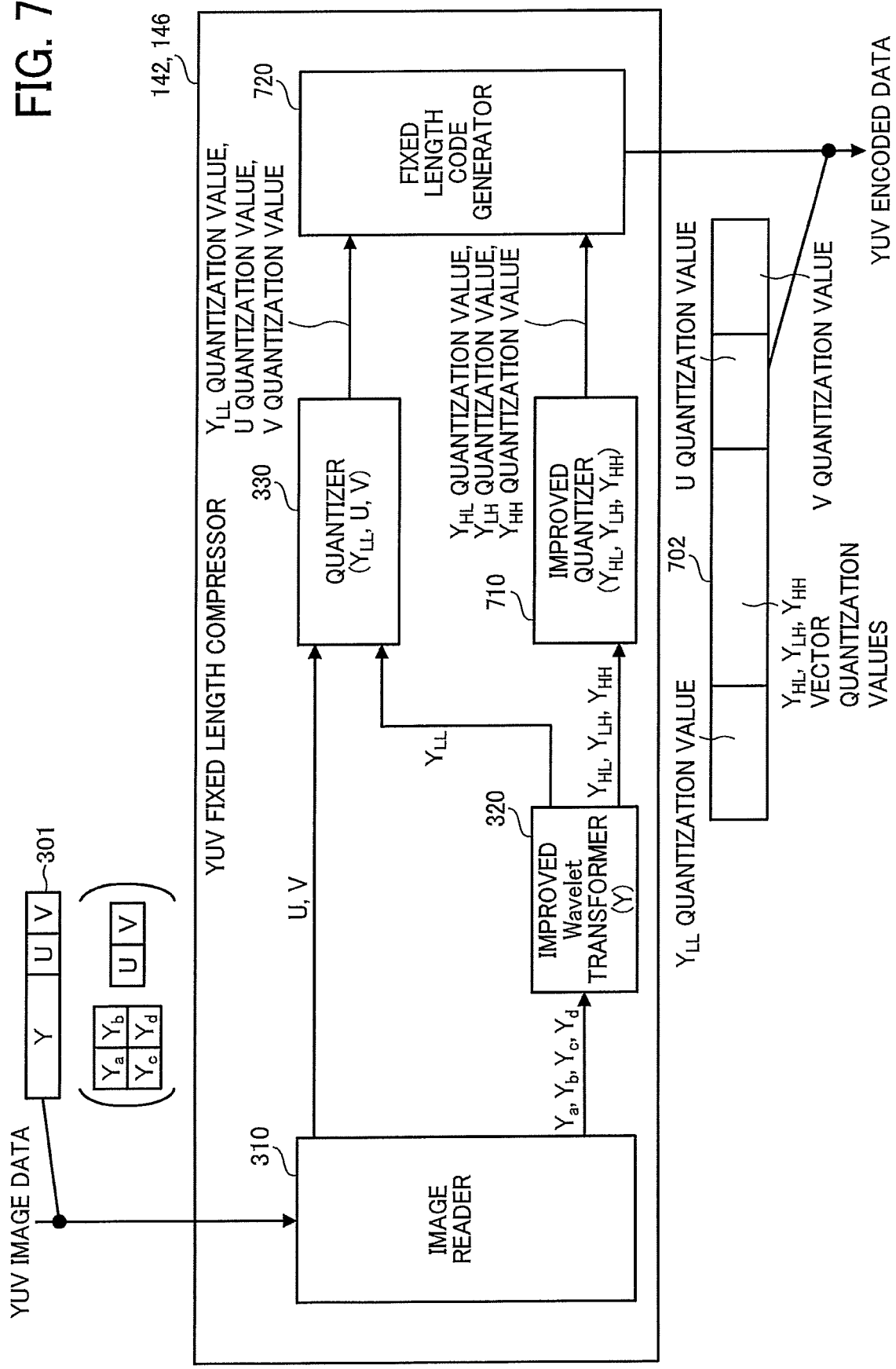
FIG. 7 is a diagram illustrating an arrangement example of a YUV fixed length compressor of an image processing device according to a second embodiment.

First, the functional arrangement of YUV fixed length compressors 142 and 146 will be described. FIG. 7 is a diagram illustrating an arrangement example of the YUV fixed length compressor of an image processing device according to the second embodiment. Differences from FIG. 3 are an improved quantizer ($Y_{HL}$, $Y_{LH}$, $Y_{HH}$) 710 and a fixed length code generator 720.

The improved quantizer ($Y_{HL}$, $Y_{LH}$, $Y_{HH}$) 710 vector-quantizes $Y_{HL}$, $Y_{LH}$, and $Y_{HH}$ transferred from an improved Wavelet transformer (Y) 320 and calculates $Y_{HL}$, $Y_{LH}$, and $Y_{HH}$ vector quantization values. In addition, the improved quantizer ($Y_{HL}$, $Y_{LH}$, $Y_{HH}$) 710 transfers the calculated $Y_{HL}$, $Y_{LH}$, and $Y_{HH}$ vector quantization values to the fixed length code generator 720.

The $Y_{HL}$, $Y_{LH}$, and $Y_{HH}$ vector quantization values are values quantized by replacing various combinations of $Y_{HL}$, $Y_{LH}$, and $Y_{HH}$ (vectors) with predetermined vector numbers (scalar values) (details will be described later).

The fixed length code generator 720 acquires the $Y_{LL}$ quantization value, the U quantization value, and the V quantization value transferred from a quantizer ($Y_{LL}$, U, V) 330 and the $Y_{HL}$, $Y_{LH}$, and $Y_{HH}$ vector quantization values transferred from the improved quantizer ($Y_{HL}$, $Y_{LH}$, $Y_{HH}$) 710. In addition, the fixed length code generator 720 generates the YUV encoded data of a fixed length illustrated in a code format 702 based on each acquired quantization value to output. The difference from the code format 302 in FIG. 3 is that the $Y_{HL}$, $Y_{LH}$, and $Y_{HH}$ vector quantization values are defined in a region where the $Y_{HL}$ quantization value, the $Y_{LH}$ quantization value, and the $Y_{HH}$ quantization value have been defined.

(2) Functional Arrangement of Improved Quantizer

Figure 8:
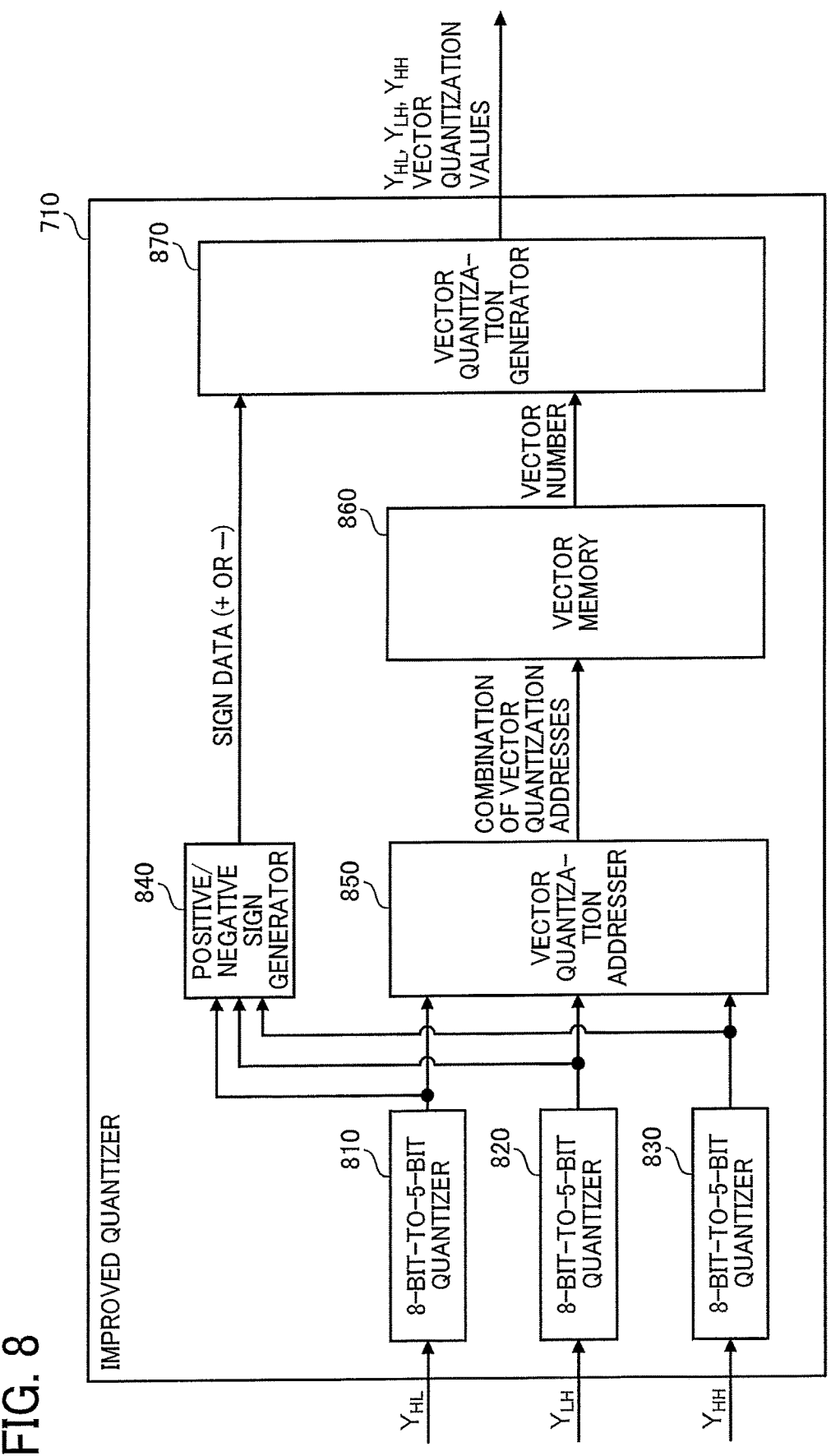
FIG. 8 is a diagram illustrating an arrangement example of an improved quantizer.

Next, the functional arrangement of the improved quantizer ($Y_{HL}$, $Y_{LH}$, $Y_{HH}$) 710 of each of the YUV fixed length compressors 142 and 146 will be described. FIG. 8 is a diagram illustrating an arrangement example of the improved quantizer.

As illustrated in FIG. 8, the improved quantizer ($Y_{HL}$, $Y_{LH}$, $Y_{HH}$) 710 includes 8-bit-to-5-bit quantizers 810, 820 and 830, a positive/negative sign generator 840, a vector quantization addresser 850, a vector memory 860, and a vector quantization generator 870.

The 8-bit-to-5-bit quantizer 810 quantizes $Y_{HL}$ transferred from the improved Wavelet transformer (Y) 320 from eight bits to five bits. Specifically, the 8-bit-to-5-bit quantizer 810 performs lossy compression that reduces lower three bits. Similarly, the 8-bit-to-5-bit quantizers 820 and 830 quantize $Y_{LH}$ and $Y_{HH}$ transferred from the improved Wavelet transformer (Y) 320 from eight bits to five bits, respectively. Specifically, the 8-bit-to-5-bit quantizers 820 and 830 perform lossy compression that reduces lower three bits.

The reason of adopting an arrangement to reduce the lower three bits in the 8-bit-to-5-bit quantizer 810 and the like is that, in the case of ($Y_{HL}$, $Y_{LH}$, $Y_{HH}$) transferred from the improved Wavelet transformer (Y) 320, the influence on degradation of the image quality is relatively small even when the lower three bits are reduced. In addition, the reason is to further increase the effect of reducing the number of bits by lossless compression in the vector memory 860, which will be described later.

The positive/negative sign generator 840 generates the data indicating each of a sign of $Y_HL$ output from the 8-bit-to-5-bit quantizer 810, a sign of $Y_{LH}$ output from the 8-bit-to-5-bit quantizer 820, and a sign of $Y_{HH}$ output from the 8-bit-to-5-bit quantizer 830.

The vector quantization addresser 850 temporarily removes the signs of $Y_{HL}$, $Y_{LH}$, and $Y_{HH}$ output from the 8-bit-to-5-bit quantizers 810 to 830 to set $Y_{HL}$, $Y_{LH}$, and $Y_{HH}$ to positive integers and generates 4-bit vector quantization addresses. Specifically, the vector quantization addresser 850 sets a plus or minus value of five bits to a plus value of four bits. As a consequence, a $Y_{HL}$ vector quantization address, a $Y_{LH}$ vector quantization address, and a $Y_{HH}$ vector quantization address output from the vector quantization addresser 850 are set to any one of 16 values from 0 to 15.

The vector quantization addresser 850 outputs a combination of the $Y_{HL}$ vector quantization address, the $Y_{LH}$ vector quantization address, and the $Y_{HH}$ vector quantization address to the vector memory 860. Each of the $Y_{HL}$ vector quantization address, $Y_{LH}$ vector quantization address, and $Y_{HH}$ vector quantization address output from the vector quantization addresser 850 is any one of 16 values from 0 to 15. Accordingly, the combination of the vector quantization addresses output from the vector quantization addresser 850 is set to any one of 16×16×16=4096 combinations.

The vector memory 860 is an example of a first memory and converts a combination of the vector quantization addresses output from the vector quantization addresser 850 into a predetermined vector number. The vector memory 860 transfers the converted vector number to the vector quantization generator 870.

The vector quantization generator 870 combines sign data (+ or −) transferred from the positive/negative sign generator 840 and the vector number transferred from the vector memory 860, thereby generating the $Y_{HL}$, $Y_{LH}$, and $Y_{HH}$ vector quantization values to output.

(3) Details of Processes of Vector Quantization Addresser and Vector Memory

Figure 9A:
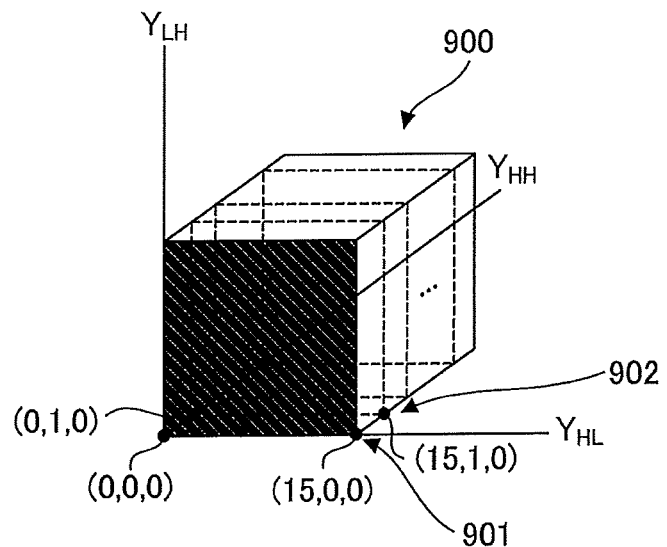
FIGS. 9A, 9B, and 9C are diagrams for explaining processes in a vector quantization addresser and a vector memory.
Figure 9B:
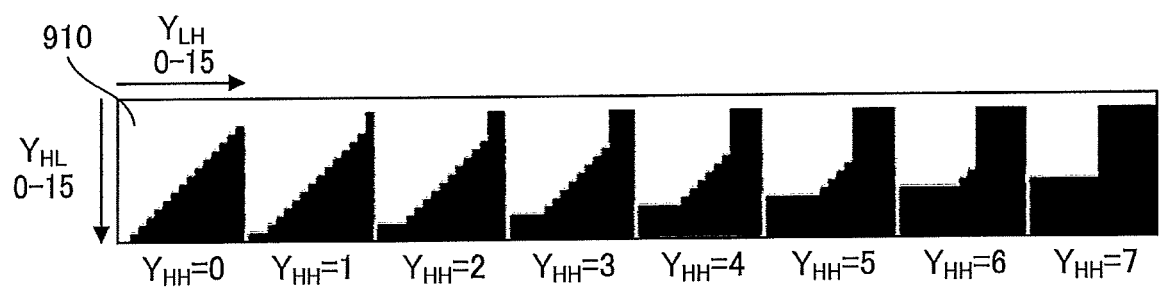
Figure 9C:
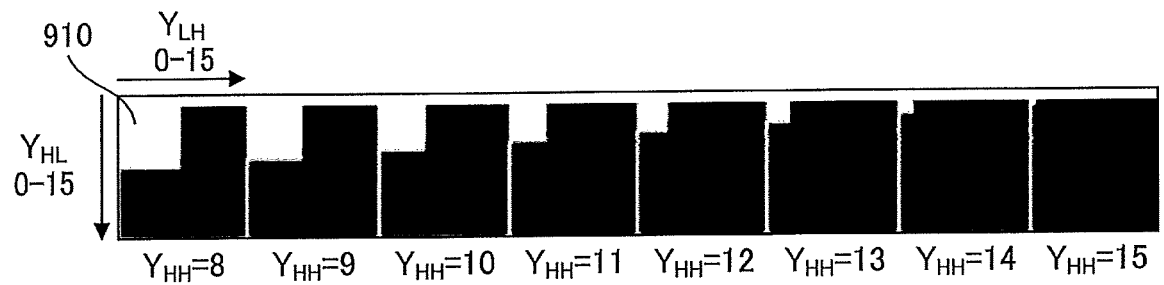

Next, the details of the processes of the vector quantization addresser 850 and the vector memory 860 will be described. FIGS. 9A, 9B, and 9C are diagrams for explaining the details of processes in the vector quantization addresser and the vector memory.

Among these diagrams, FIG. 9A is a conceptual diagram illustrating a combination of the vector quantization addresses generated in the vector quantization addresser 850. The combination of the vector quantization addresses output from the vector quantization addresser 850 can be expressed as respective coordinates in a coordinate space 900 with the $Y_{HL}$ vector quantization address, the $Y_{LH}$ vector quantization address, and the $Y_{HH}$ vector quantization address as axes.

For example, the combination of ($Y_{HL}$ vector quantization address, $Y_{LH}$ vector quantization address, $Y_{HH}$ vector quantization address)=(15, 0, 0) can be expressed as coordinates 901 in the coordinate space 900. Similarly, the combination of ($Y_{HL}$, vector quantization address, $Y_{LH}$ vector quantization address, $Y_{HH}$ vector quantization address)=(15, 1, 0) can be expressed as coordinates 902 in the coordinate space 900.

FIGS. 9B and 9C are diagrams schematically illustrating the existence positions of combinations of the vector quantization addresses that can be output from the vector quantization addresser 850 in the coordinate space 900.

Here, the vector quantization addresses output from the vector quantization addresser 850 are values obtained by performing the improved type discrete wavelet transform process on the luminance values ($Y_a$, $Y_b$, $Y_c$, and $Y_d$) and reducing the lower three bits from the resultant values. Accordingly, based on the possible values taken by the luminance values ($Y_a$, $Y_b$, $Y_c$, and $Y_d$), it is possible to specify the existence range of combinations of the vector quantization addresses.

FIGS. 9B and 9C illustrate the combinations of the vector quantization addresses calculated for all possible values taken by the luminance values ($Y_a$, $Y_b$, $Y_c$, and $Y_d$).

For example, a plane 910 is a plane with the $Y_{HH}$ vector quantization address="0" in the coordinate space 900, where the range in which combinations of the $Y_{HL}$ vector quantization addresses and the $Y_{LH}$ vector quantization addresses exist is indicated in white and the range in which these combinations do not exist is indicated in black.

As illustrated in FIGS. 9B and 9C, not every combination of the $Y_{HL}$ vector quantization address and the $Y_{LH}$ vector quantization address exists for each $Y_{HH}$ vector quantization address and there are combinations which cannot actually exist. In addition, as illustrated in FIGS. 9B and 9C, as the $Y_{HH}$ vector quantization address increases, the range in which combinations of the $Y_{HL}$ vector quantization address and the $Y_{LH}$ vector quantization address exist decreases.

The vector memory 860 utilizes such characteristics to assign a vector number to a combination of the vector quantization addresses that can exist and replace a combination of the vector quantization addresses output from the vector quantization addresser 850 with this vector number.

FIGS. 10A and 10B are diagrams illustrating specific examples of a vector quantization table stored in the vector memory. FIG. 10A illustrates a vector quantization table 1000 in which vector numbers made up of consecutive different numbers (sequential numbers) are assigned to the combinations of the $Y_{HL}$ vector quantization addresses and the $Y_{LH}$ vector quantization addresses in the case of the $Y_{HH}$ vector quantization address="0". Note that the vector number is assigned to a combination that exists among the combinations of the $Y_{HL}$ vector quantization addresses and the $Y_{LH}$ vector quantization addresses.

As a result, according to the vector quantization table 1000, for example, ($Y_{HL}$ vector quantization address, $Y_{LH}$ vector quantization address, $Y_{HH}$ vector quantization address)=(15, 0, 0) will be replaced with a vector number="15". Similarly, ($Y_{HL}$ vector quantization address, $Y_{LH}$ vector quantization address, $Y_{HH}$ vector quantization address)=(0, 15, 0) will be replaced with a vector number="135".

FIG. 10B illustrates a vector quantization table 1001 in which vector numbers made up of sequential numbers are assigned to the combinations of the $Y_{HL}$ vector quantization addresses and the $Y_{LH}$ vector quantization addresses in the case of the $Y_{HH}$ vector quantization address="1". Also in the vector quantization table 1001, the vector number is assigned to a combination that exists among the combinations of the $Y_{HL}$ vector quantization addresses and the $Y_{LH}$ vector quantization addresses.

As a result, according to the vector quantization table 1001, for example, ($Y_{HL}$ vector quantization address, $Y_{LH}$ vector quantization address, $Y_{HH}$ vector quantization address)=(14, 0, 1) will be replaced with a vector number="150". Similarly, ($Y_{HL}$ vector quantization address, $Y_{LH}$ vector quantization address, $Y_{HH}$ vector quantization address)=(0, 14, 1) will be replaced with a vector number="268".

Similarly, the vector memory 860 has subsequent vector quantization tables in which vector numbers are assigned to the combinations of the $Y_{HL}$ vector quantization addresses and the $Y_{LH}$ vector quantization addresses in each case where the $Y_{HH}$ vector quantization address is "2" to "15".

That is, the vector memory 860 can replace the combination (total of 12 bits) of the $Y_{HL}$ vector quantization address (four bits), the $Y_{LH}$ vector quantization address (four bits), and the $Y_{HH}$ vector quantization address (four bits) with the "vector number". The vector numbers are assigned with sequential numbers excluding combinations that do not exist as a combination of the vector quantization addresses and thus fall within values between roughly 0 and 1000.

As a result, according to the vector memory 860, it is possible to decrease the number of bits by lossless compression from a combination of the vector quantization addresses (a total of 12 bits) to a vector number of about ten bits. That is, in generating the YUV encoded data of a fixed length, the number of bits to be reduced by lossless compression can be increased by two bits (the number of bits to be reduced by lossy compression can be decreased by two bits).

In generating the YUV encoded data of a fixed length, the number of bits to be reduced by lossless compression is increased and the number of bits to be reduced by lossy compression is decreased in this manner, whereby degradation of the image quality that occurs at the time of decoding the YUV image data can be suppressed. As described above, the effect of reducing the number of bits by lossless compression in the vector memory 860 is further increased by decreasing the number of bits beforehand in the 8-bit-to-5-bit quantizer 810 or the like.

<2. Details of YUV Fixed Length Decoder>

(1) Functional Arrangement of YUV Fixed Length Decoder

Figure 11:
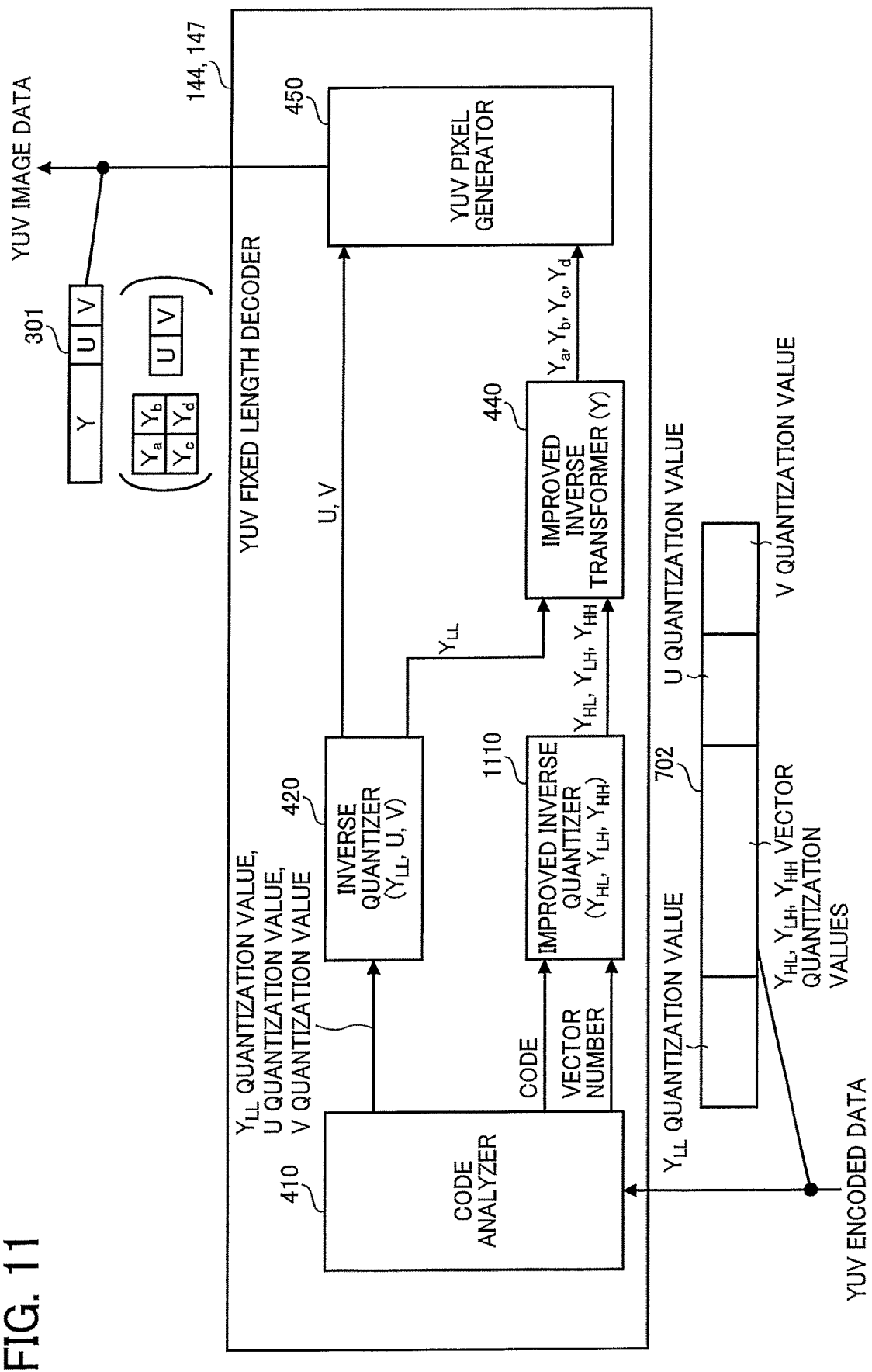
FIG. 11 is a diagram illustrating an arrangement example of the YUV fixed length decoder of the image processing device according to the second embodiment.

Next, the functional arrangement of the YUV fixed length decoders 144 and 147 of the image processing device 140 according to the second embodiment will be described. FIG. 11 is a diagram illustrating an arrangement example of the YUV fixed length decoder of the image processing device according to the second embodiment. The difference from FIG. 4 is that an improved inverse quantizer ($Y_{HL}$, $Y_{LH}$, $Y_{HH}$) 1110 is provided.

The improved inverse quantizer ($Y_{HL}$, $Y_{LH}$, $Y_{HH}$) 1110 is an example of an inverse quantizer and inversely quantizes a vector number obtained by excluding signs from the $Y_{HL}$, $Y_{LH}$, and $Y_{HH}$ vector quantization values transferred from the code analyzer 410, thereby calculating $Y_{HL}$, $Y_{LH}$, and $Y_{HH}$. In addition, the improved inverse quantizer ($Y_{HL}$, $Y_{LH}$, $Y_{HH}$) 1110 assigns signs to calculated $Y_{HL}$, $Y_{LH}$, and $Y_{HH}$ and transfers resultant $Y_{HL}$, $Y_{LH}$, and $Y_{HH}$ to the improved inverse transformer (Y) 440.

(2) Functional Arrangement of Improved Inverse Quantizer

Figures 12, 13:
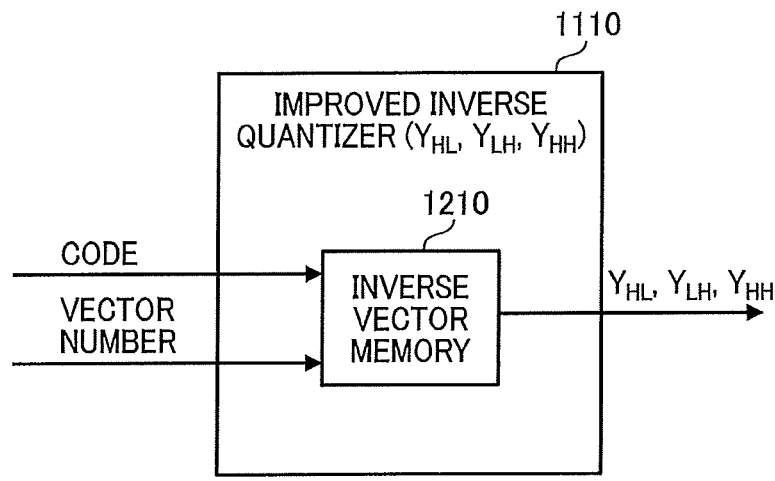
FIG. 12 is a diagram illustrating an arrangement example of an improved inverse quantizer.
FIG. 13 is a diagram illustrating a specific example of an inverse vector quantization table stored in an inverse vector memory.

Next, the functional arrangement of the improved inverse quantizer ($Y_{HL}$, $Y_{LH}$, $Y_{HH}$) 1110 of each of the YUV fixed length decoders 144 and 147 will be described. FIG. 12 is a diagram illustrating an arrangement example of an improved inverse quantizer.

As illustrated in FIG. 12, the improved inverse quantizer ($Y_{HL}$, $Y_{LH}$, $Y_{HH}$) 1110 includes an inverse vector memory 1210.

The inverse vector memory 1210 is an example of a second memory and performs a process of returning the vector number to $Y_{HL}$, $Y_{LH}$, and $Y_{HH}$. In addition, the inverse vector memory 1210 assigns signs to $Y_{HL}$, $Y_{LH}$, and $Y_{HH}$ and transfers resultant $Y_{HL}$, $Y_{LH}$, and $Y_{HH}$ to the improved inverse transformer (Y) 440.

(3) Details of Process of Inverse Vector Memory

Next, the details of the process of the inverse vector memory 1210 will be described. FIG. 13 is a diagram illustrating a specific example of an inverse vector quantization table stored in the inverse vector memory. As illustrated in FIG. 13, the inverse vector memory 1210 stores an inverse vector quantization table 1300 storing $Y_{HL}$, $Y_{LH}$, and $Y_{HH}$ corresponding to the vector number.

According to the inverse vector quantization table 1300, for example, it is possible to return a vector number="1" to ($Y_{HL}$, $Y_{LH}$, $Y_{HH}$)=(1, 0, 0). Similarly, it is possible to return a vector number="135" to ($Y_{HL}$, $Y_{LH}$, $Y_{HH}$)=(0, 15, 0).

<3. Summary>

As is apparent from the above description, the image processing device 140 according to the present embodiment: reduces the lower three bits having less influence on the image quality using the YUV fixed length compressor to decrease the number of bits of $Y_{HL}$, $Y_{LH}$, and $Y_{HH}$ calculated by performing the improved type discrete wavelet transform process;—verifies combinations that can exist as combinations of $Y_{HL}$, $Y_{LH}$, and $Y_{HH}$ whose number of bits has been decreased and assigns sequential vector numbers to the combinations that can exist; and —furthermore, replaces the combination of $Y_{HL}$, $Y_{LH}$, and $Y_{HH}$ with the vector number to calculate $Y_{HL}$, $Y_{LH}$, and $Y_{HH}$ vector quantization values and generates the fixed length encoded data.

As a consequence, in the image processing device 140 according to the present embodiment, when the YUV image data is quantized to generate the YUV encoded data of a fixed length, the number of bits to be reduced by lossless compression can be increased and the number of bits to be reduced by lossy compression can be decreased.

As a result, according to the image processing device 140 according to the present embodiment, it is possible to suppress degradation of the image quality that occurs at the time of decoding the YUV image data.

Third Embodiment

A third embodiment will describe a method for generating the vector quantization table and the inverse vector quantization table described with reference to FIGS. 10 and 13 in the second embodiment.

<1. Arrangement of Table Generation System>

Figure 14:
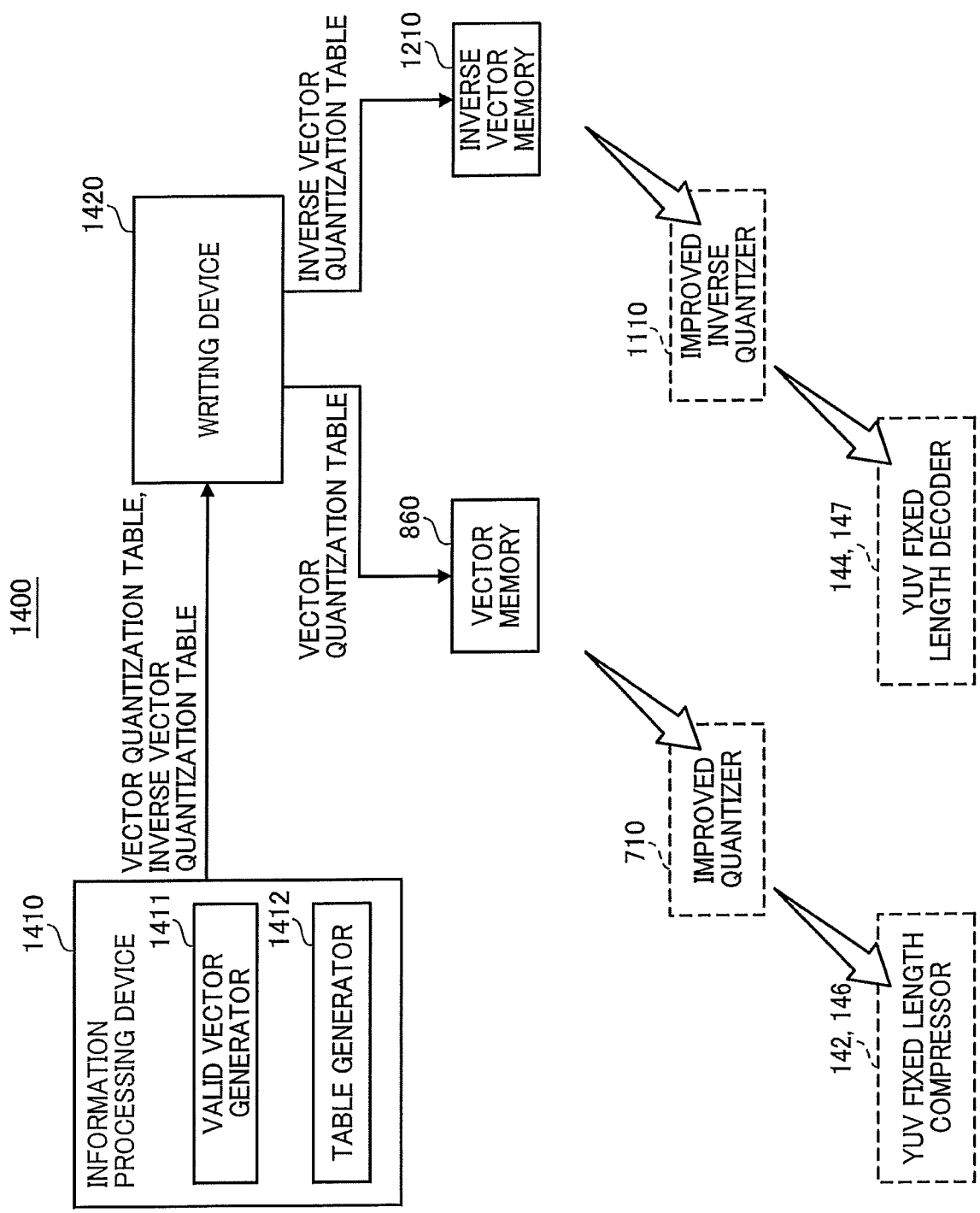
FIG. 14 is a diagram illustrating an arrangement example of a table generation system.

First, a table generation system for generating the vector quantization table and the inverse vector quantization table will be described. FIG. 14 is a diagram illustrating an arrangement example of the table generation system. As illustrated in FIG. 14, a table generation system 1400 includes an information processing device 1410 and a writing device 1420.

A valid vector generation program and a table generation program are installed in the information processing device 1410 and, when these programs are executed, the information processing device 1410 functions as a valid vector generator 1411 and a table generator 1412.

The valid vector generator 1411 calculates the combinations of the $Y_{HL}$ vector quantization addresses, the $Y_{LH}$ vector quantization addresses, and the $Y_{HH}$ vector quantization addresses that a vector quantization addresser 850 can output (a white portion in FIG. 9B).

The table generator 1412 assigns vector numbers to the combinations calculated by the valid vector generator 1411 with sequential numbers to generate the vector quantization table and the inverse vector quantization table. In addition, the table generator 1412 transfers the generated vector quantization table and inverse vector quantization table to the writing device 1420.

The writing device 1420 writes the vector quantization table transferred from the information processing device 1410 into a vector memory 860. The writing device 1420 also writes the inverse vector quantization table transferred from the information processing device 1410 into an inverse vector memory 1210.

Note that the vector memory 860 in which the vector quantization table is written is incorporated in an improved quantizer ($Y_{HL}$, $Y_{LH}$, $Y_{HH}$) 710. In addition, the improved quantizer ($Y_{HL}$, $Y_{LH}$, $Y_{HH}$) 710 is further incorporated in each of the YUV fixed length compressors 142 and 146.

Similarly, the inverse vector memory 1210 in which the inverse vector quantization table is written is incorporated in an improved inverse quantizer ($Y_{HL}$, $Y_{LH}$, $Y_{HH}$) 1110. In addition, the improved inverse quantizer ($Y_{HL}$, $Y_{LH}$, $Y_{HH}$) 1110 is further incorporated in each of the YUV fixed length decoders 144 and 147.

<2. Flow of Valid Vector Generation Process>

Figure 15B:
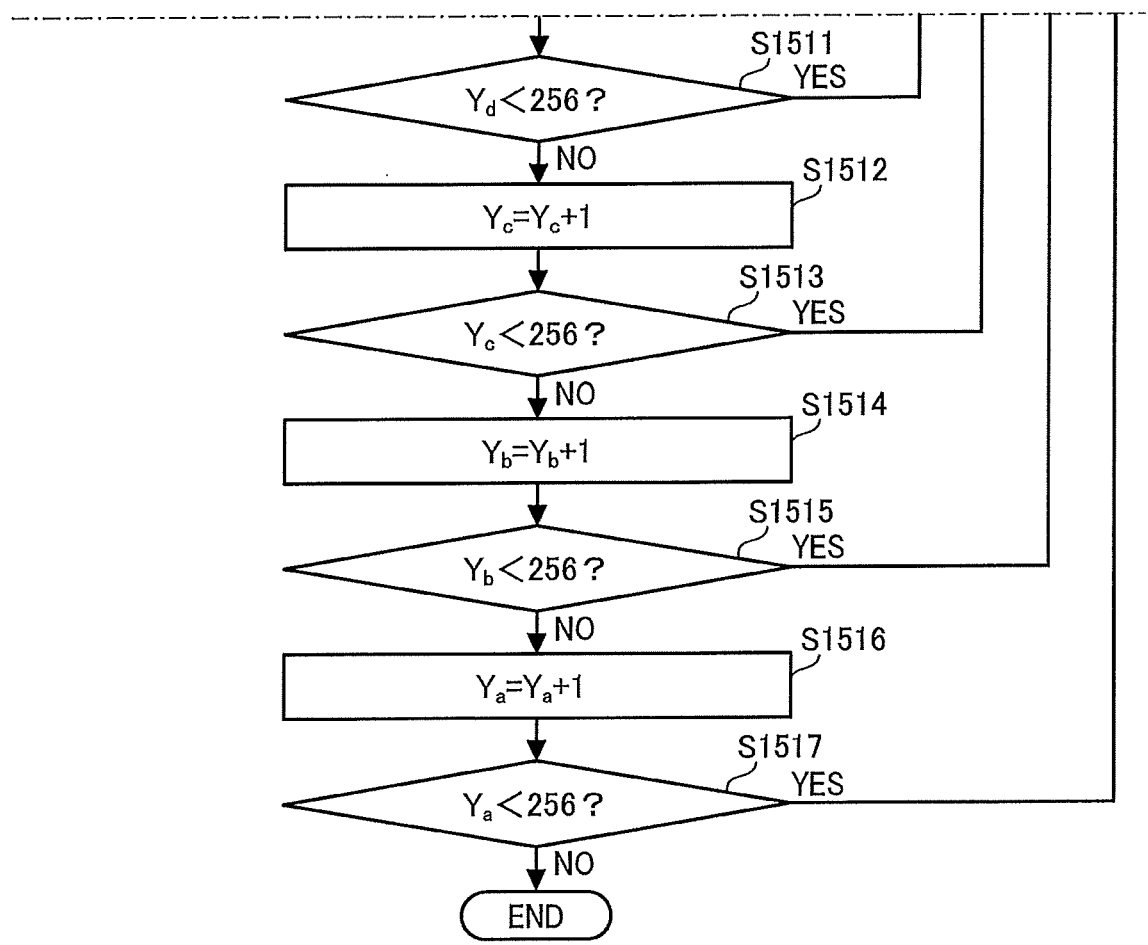
FIG. 15 (consisting of FIGS. 15A and 15B) is a flowchart illustrating a flow of a valid vector generation process.

Next, the flow of a valid vector generation process by the valid vector generator 1411 will be described. FIG. 15 (consisting of FIGS. 15A and 15B) is a flowchart illustrating a flow of the valid vector generation process.

In step S1501, the valid vector generator 1411 clears ($Y_{HL}$, $Y_{LH}$, $Y_{HH}$) (sets a state in which no value is input). Subsequently, the valid vector generator 1411 inputs zero to $Y_a$ in step S1502 and inputs zero to $Y_b$ in step S1503. Furthermore, the valid vector generator 1411 inputs zero to $Y_c$ in step S1504 and inputs zero to $Y_d$ in step S1505.

In step S1506, the valid vector generator 1411 performs the improved type discrete wavelet transform process using $Y_a$, $Y_b$, $Y_c$, and $Y_d$ to calculate $Y_{HL}$, $Y_{LH}$, and $Y_{HH}$.

In step S1507, the valid vector generator 1411 reduces lower three bits of each of $Y_{HL}$, $Y_{LH}$, and $Y_{HH}$ calculated in step S1506 to convert each value to 5-bit data.

In step S1508, the valid vector generator 1411 deletes a sign of each of 5-bit $Y_{HL}$, $Y_{LH}$, and $Y_{HH}$ converted in step S1507 to generate 4-bit $Y_{HL}$, $Y_{LH}$, and $Y_{HH}$.

In step S1509, the valid vector generator 1411 determines that the combination of the 4-bit $Y_{HL}$, $Y_{LH}$, and $Y_{HH}$ generated in step S1508 is valid.

In step S1510, the valid vector generator 1411 increments $Y_d$ and proceeds to step S1511. In step S1511, the valid vector generator 1411 determines whether the value of $Y_d$ is less than 256.

In step S1511, when it is determined that the value of $Y_d$ is less than 256 (in the case of Yes in step S1511), the process returns to step S1506. On the other hand, when it is determined in step S1511 that the value of $Y_d$ is not less than 256 (in the case of No in step S1511), the process proceeds to step S1512.

In step S1512, the valid vector generator 1411 increments $Y_c$ and proceeds to step S1513. In step S1513, the valid vector generator 1411 determines whether the value of $Y_c$ is less than 256.

In step S1513, when it is determined that the value of $Y_c$ is less than 256 (in the case of Yes in step S1513), the process returns to step S1505. On the other hand, when it is determined in step S1513 that the value of $Y_c$ is not less than 256 (in the case of No in step S1513), the process proceeds to step S1514.

In step S1514, the valid vector generator 1411 increments $Y_b$ and proceeds to step S1515. In step S1515, the valid vector generator 1411 determines whether the value of $Y_b$ is less than 256.

In step S1515, when it is determined that the value of $Y_b$ is less than 256 (in the case of Yes in step S1515), the process returns to step S1504. On the other hand, when it is determined in step S1515 that the value of $Y_b$ is not less than 256 (in the case of No in step S1515), the process proceeds to step S1516.

In step S1516, the valid vector generator 1411 increments $Y_a$ and proceeds to step S1517. In step S1517, the valid vector generator 1411 determines whether the value of $Y_a$ is less than 256.

In step S1517, when it is determined that the value of $Y_a$ is less than 256 (in the case of Yes in step S1517), the process returns to step S1503. On the other hand, when it is determined in step S1517 that the value of $Y_a$ is not less than 256 (in the case of No in step S1517), the valid vector generation process is terminated.

In this manner, the valid vector generator 1411 generates all the combinations while changing the values of $Y_a$, $Y_b$, $Y_c$, and $Y_d$ by one within the range of 0 to 255 to calculate $Y_{HL}$, $Y_{LH}$, and $Y_{HH}$. As a consequence, the valid vector generator 1411 can determine combinations that can exist (valid combinations) from among the combinations of $Y_{HL}$, $Y_{LH}$, and $Y_{HH}$.

<3. Flow of Table Generation Process>

Figure 16B:
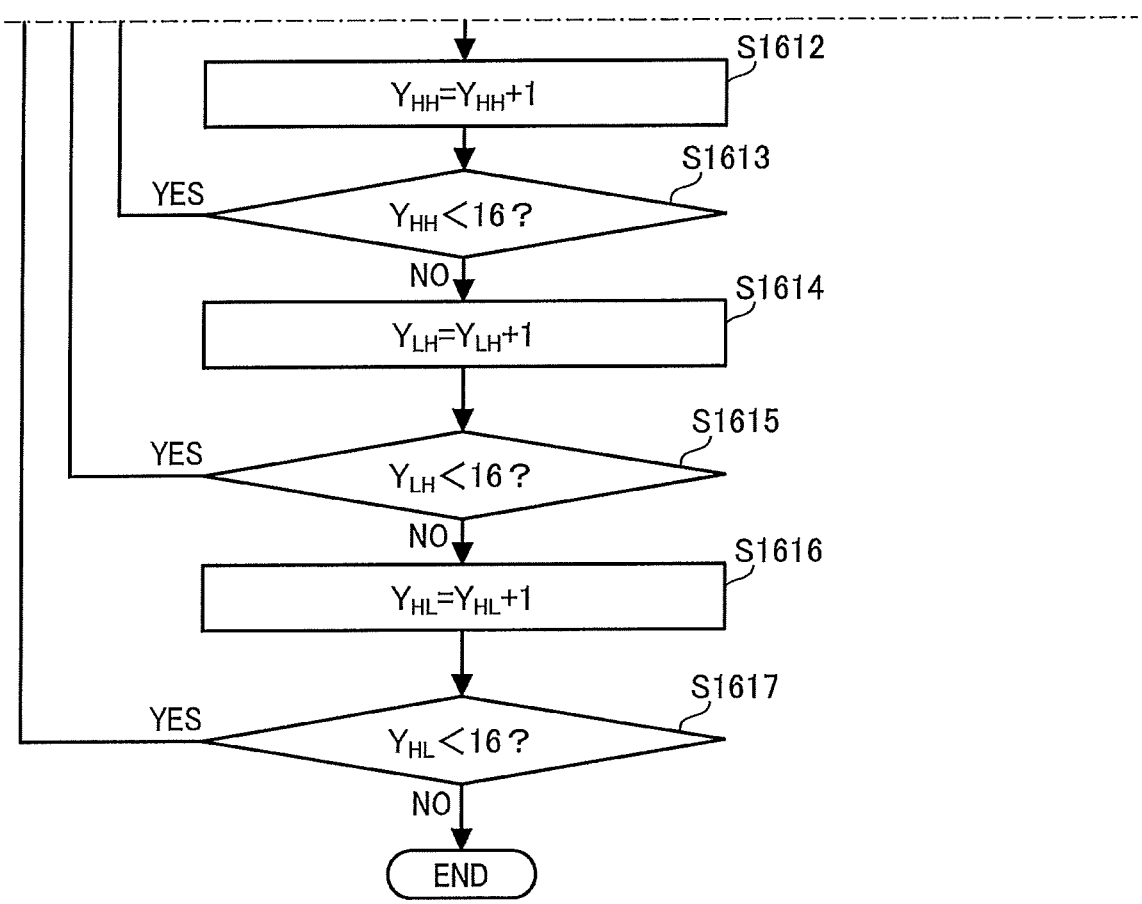
FIG. 16 (consisting of FIGS. 16A and 16B) is a flowchart illustrating a flow of a table generation process.

Next, the flow of a table generation process by the table generator 1412 will be described. FIG. 16 (consisting of FIGS. 16A and 16B) is a flowchart illustrating a flow of the table generation process.

In step S1601, the table generator 1412 inputs "0" to a vector number "N".

Subsequently, the table generator 1412 inputs zero to $Y_{HL}$ in step S1602, inputs zero to $Y_{LH}$ in step S1603, and inputs zero to $Y_{HH}$ in step S1604.

In step S1605, the table generator 1412 determines whether the combination of current $Y_{HL}$, $Y_{LH}$, and $Y_{HH}$ is valid. The table generator 1412 refers to the process result of the valid vector generation process (FIG. 15) to determine whether the combination of current $Y_{HL}$, $Y_{LH}$, and $Y_{HH}$ is valid.

In step S1605, when it is determined that the combination is not valid (in the case of No in step S1605), the process proceeds to step S1606. In step S1606, the table generator 1412 records a vector number "0" in a region corresponding to the combination of current $Y_{HL}$, $Y_{LH}$, and $Y_{HH}$ in the vector quantization table (refer to FIG. 10).

On the other hand, when it is determined in step S1605 that the combination is valid (in the case of Yes in step S1605), the process proceeds to step S1607. In step S1607, the table generator 1412 records the vector number "N" in a region corresponding to the combination of current $Y_{HL}$, $Y_{LH}$, and $Y_{HH}$ in the vector quantization table (refer to FIG. 10).

In step S1608, the table generator 1412 records current $Y_{HL}$ in association with the vector number "N" in the inverse vector quantization table (refer to FIG. 13).

In step S1609, the table generator 1412 records current $Y_{LH}$ in association with the vector number "N" in the inverse vector quantization table (refer to FIG. 13).

In step S1610, the table generator 1412 records current $Y_{HH}$ in association with the vector number "N" in the inverse vector quantization table (refer to FIG. 13).

In step S1611, the table generator 1412 increments the vector number "N" and proceeds to step S1612.

In step S1612, the table generator 1412 increments $Y_{HH}$ and proceeds to step S1613.

In step S1613, the table generator 1412 determines whether current $Y_{HH}$ is less than 16. In step S1613, when it is determined that current $Y_{HH}$ is less than 16 (in the case of Yes in step S1613), the process returns to step S1605.

On the other hand, when it is determined in step S1613 that current $Y_{HH}$ is not less than 16 (in the case of No in step S1613), the process proceeds to step S1614.

In step S1614, the table generator 1412 increments $Y_{LH}$ and proceeds to step S1615.

In step S1615, the table generator 1412 determines whether current $Y_{LH}$ is less than 16. In step S1615, when it is determined that current $Y_{LH}$ is less than 16 (in the case of Yes in step S1615), the process returns to step S1604.

On the other hand, when it is determined in step S1615 that current $Y_{LH}$ is not less than 16 (in the case of No in step S1615), the process proceeds to step S1616.

In step S1616, the table generator 1412 increments $Y_{HL}$ and proceeds to step S1617.

In step S1617, the table generator 1412 determines whether current $Y_{HL}$ is less than 16. In step S1617, when it is determined that current $Y_{HL}$ is less than 16 (in the case of Yes in step S1617), the process returns to step S1603.

On the other hand, when it is determined in step S1617 that current $Y_{HL}$ is not less than 16 (in the case of No in step S1617), the table generation process is terminated.

In this manner, the table generator 1412 assigns the sequential vector numbers to the combinations that are determined to be valid in the valid vector generation process among the combinations of $Y_{HL}$, $Y_{LH}$, and $Y_{HH}$ to record in the vector quantization table. In addition, $Y_{HL}$, $Y_{LH}$, and $Y_{HH}$ corresponding to the vector number are recorded in the inverse vector quantization table. As a consequence, the table generator 1412 can generate the vector quantization table and the inverse vector quantization table.

Fourth Embodiment

In the arrangement of the third embodiment described above, when the vector quantization table and the inverse vector quantization table are generated, $Y_{HL}$, $Y_{LH}$, and $Y_{HH}$ are calculated while each of $Y_a$, $Y_b$, $Y_c$, and $Y_d$ is changed by one within the range of 0 to 255.

However, the method for generating the vector quantization table and the inverse vector quantization table is not limited to the above method. For example, a standard color image (for example, an N5 chart) may be referred to such that $Y_{HL}$, $Y_{LH}$, and $Y_{HH}$ are calculated for combinations of $Y_a$, $Y_b$, $Y_c$, and $Y_d$ corresponding to RGB data included in this standard color image.

In addition, in the arrangement of the third embodiment, when the vector quantization table is generated, different vector numbers are assigned to all the combinations of $Y_{HL}$, $Y_{LH}$, and $Y_{HH}$ determined to be valid in the valid vector generation process.

However, the same vector number as another combination may be assigned to a combination having a low probability of existence less than a threshold value among the combinations of $Y_{HL}$, $Y_{LH}$, and $Y_{HH}$ determined to be valid. As a consequence, since the combination to which the vector number is to be assigned is restricted to combinations having the probability of existence equal to or larger than the threshold value, the maximum value of the vector number can be made smaller. As a result, it is possible to further reduce the number of bits of the $Y_{HL}$, $Y_{LH}$, and $Y_{HH}$ vector quantization values while the influence on degradation of the image quality that occurs at the time of decoding the YUV image data is made smaller.

In addition, in assigning the same vector number as another combination to a certain combination, it is preferable to use a vector number of another combination close to the certain combination. As another combination close to the certain combination, for example, a combination recorded in a close position in the vector quantization table can be cited. Alternatively, another combination having a maximum inner product with the certain combination is cited.

Furthermore, the above third embodiment describes that the writing device 1420 writes the vector quantization table to the vector memory 860, but the writing destination for the vector quantization table is not limited to the vector memory 860. For example, the vector quantization table may be written in another memory in the image processing device 140 such that the vector memory 860 reads the vector quantization table from the another memory when the image processing device 140 is activated.

Similarly, the above third embodiment describes that the writing device 1420 writes the inverse vector quantization table to the inverse vector memory 1210, but the writing destination for the inverse vector quantization table is not limited to the inverse vector memory 1210. For example, the inverse vector quantization table may be written in another memory in the image processing device 140 such that the inverse vector memory 1210 reads the inverse vector quantization table from the another memory when the image processing device 140 is activated.

In the above first to third embodiments describe that the distortion corrector 145 is provided in the image processing device 140, but a function for executing another image process may be provided in place of the distortion corrector 145.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuity. A processing circuit also includes devices such as an application specific integrated circuit (ASIC), digital signal processor (DSP), field programmable gate array (FPGA), and conventional circuit components arranged to perform the recited functions.

What is claimed is:

1. An image processing device, comprising:
   circuitry to
      read YUV image data for a block of a predetermined size;
      perform a discrete wavelet transform on Y values included in the block to obtain first wavelet transformed Y values;
      multiply at least one of the first wavelet transformed Y values by a coefficient used for inversely transforming the first wavelet transformed Y values, to calculate second transformed Y values;
      quantize a U value and a V value included in the block, and quantize the second transformed Y values to generate fixed length encoded data;
      inversely quantize the fixed length encoded data to calculate the second transformed Y values; and
      inversely transform the second transformed Y values without using the coefficient.

2. The image processing device according to claim 1, wherein the circuitry is further configured to multiply the first wavelet transformed Y values, except a low frequency component, by the coefficient.

3. The image processing device according to claim 2, wherein the circuitry is further configured to use ½ or ¼ as the coefficient to calculate the second transformed Y values.

4. The image processing device according to claim 3, further comprising a first memory to store scalar values associated with possible combinations of components, except a low frequency component, included in the second transformed Y values,
   wherein the circuitry is further configured to convert a combination of components, except the low frequency component, included in the second transformed Y values into a scalar value of the scalar values stored in the first memory to quantize the components, except the low frequency component, included in the second transformed Y values.

5. The image processing device according to claim 4, further comprising a second memory to store the possible combinations of components, except the low frequency component, included in the second transformed Y values,
   wherein the circuitry is further configured to refer to the second memory and convert a scalar value included in the fixed length encoded data into a combination of components, except the low frequency component, included in the second transformed Y values, to calculate the second transformed Y values after.

6. The image processing device according to claim 4, wherein the scalar values are consecutive different numbers.

7. An image processing method, comprising:
   reading YUV image data for a block of a predetermined size;
   performing a discrete wavelet transform on Y values included in the block to obtain first wavelet transformed Y values;
   multiplying at least one of the first wavelet transformed Y values by a coefficient used for inversely transforming the first wavelet transformed Y values, to calculate second transformed Y values;
   quantizing a U value and a V value included in the block, and quantizing the second transformed Y values to generate fixed length encoded data;
   inversely quantizing the fixed length encoded data to calculate the second transformed Y values; and
   inversely transforming the second transformed Y values without using the coefficient.

8. A non-transitory recording medium storing an image processing program to cause a computer to execute:
   reading YUV image data for a block of a predetermined size;
   performing a discrete Haar wavelet transform on Y values included in the block to obtain first wavelet transformed Y values;
   multiplying at least one of the first wavelet transformed Y values by a coefficient used for inversely transforming the first wavelet transformed Y values, to calculate second transformed Y values; and
   quantizing a U value and a V value included in the block, and quantizing the second transformed Y values to generate fixed length encoded data.

9. The image processing device of claim 1, wherein the circuitry is further configured to perform a discrete Haar wavelet transform as the discrete wavelet transform to obtain the first wavelet transformed Y values.

* * * * *